(12) United States Patent
Tomomasa et al.

(10) Patent No.: US 8,894,230 B2
(45) Date of Patent: Nov. 25, 2014

(54) DISPLAY DEVICE AND TELEVISION RECEIVER DEVICE

(71) Applicant: Sharp Kabushiki Kaisha, Osaka (JP)

(72) Inventors: Masatoshi Tomomasa, Osaka (JP); Motomitsu Itoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/347,831

(22) PCT Filed: Sep. 26, 2012

(86) PCT No.: PCT/JP2012/074633
§ 371 (c)(1),
(2), (4) Date: Mar. 27, 2014

(87) PCT Pub. No.: WO2013/051438
PCT Pub. Date: Apr. 11, 2013

(65) Prior Publication Data
US 2014/0240606 A1 Aug. 28, 2014

(30) Foreign Application Priority Data

Oct. 3, 2011 (JP) .................................. 2011-219320

(51) Int. Cl.
*G09F 13/04* (2006.01)
*F21V 8/00* (2006.01)
*G02F 1/1333* (2006.01)
*H04N 5/44* (2011.01)
*H04N 5/66* (2006.01)
*G02F 1/1335* (2006.01)
*G02F 1/1345* (2006.01)

(52) U.S. Cl.
CPC ........ *G02B 6/0083* (2013.01); *G02F 1/133308* (2013.01); *H04N 5/44* (2013.01); *H04N 5/66* (2013.01); *G02F 1/133615* (2013.01); *G02F 1/13452* (2013.01); *G02F 2001/133317* (2013.01); *G02F 2001/13332* (2013.01); *G02F 2001/133322* (2013.01); *G02F 2001/133628* (2013.01); *G02F 2201/46* (2013.01); *G02F 2201/503* (2013.01)
USPC .......................................... 362/97.2; 349/58

(58) Field of Classification Search
USPC .......................................... 362/97.2; 349/58
See application file for complete search history.

(56) References Cited

U.S. PATENT DOCUMENTS

2009/0244433 A1 10/2009 Ota

FOREIGN PATENT DOCUMENTS

JP 2009-230037 A 10/2009

*Primary Examiner* — Mary Ellen Bowman
(74) *Attorney, Agent, or Firm* — Chen Yoshimura LLP

(57) ABSTRACT

A liquid crystal display device (10) includes: LEDs (17); a liquid crystal panel (11); a light guide plate (16); an exterior member that constitutes the exterior of the liquid crystal display device (10), the exterior member including a frame (13) and a chassis (14) that hold the liquid crystal panel (11) and the light guide plate (16) by sandwiching these from the display surface (11c) side and the opposite side thereto, while housing the LEDs (17) between the frame (13) and the chassis (14); a screw member (SM) that affixes the frame (13) and the chassis (14) to each other by being disposed in an outer edge portion that surrounds the liquid crystal panel (11); wiring members (28) that are connected to the LEDs (17); and wiring passages (30) through which the wiring members (28) pass, the wiring passages being formed in the inner surfaces of the side walls (13b), which is the outer edge portions of the frame (13), the wiring passages being positioned adjacent to the screw member (SM) in the direction in which the light guide plate (16) and the liquid crystal panel (11) are stacked.

15 Claims, 26 Drawing Sheets

DISPLAY DEVICE AND TELEVISION RECEIVER DEVICE

TECHNICAL FIELD

The present invention relates to a display device and a television receiver.

BACKGROUND ART

In liquid crystal display devices such as a liquid crystal television, for example, a liquid crystal panel, which is a display panel thereof, does not emit light, and therefore, it is necessary to separately provide a backlight device as an illumination device. An example of the backlight device is described in Patent Document 1 below.

RELATED ART DOCUMENT

Patent Document

Patent Document 1: Japanese Patent Application Laid-Open Publication No. 2009-230037

Problems to be Solved by the Invention

In the above-mentioned liquid crystal display device, light sources are disposed inside of a chassis of a backlight device, and a light source driver substrate for driving the light sources is disposed outside of the chassis. The light sources and the light source driver substrate are connected to each other by a wiring member that is laid out while passing through the chassis. The liquid crystal display device has a liquid crystal display unit in which a liquid crystal panel and a backlight device are held as an assembled component by a metal bezel that is placed over the liquid crystal panel from the front side thereof, and typically, the liquid crystal display unit is enclosed by a synthetic resin cabinet that is an exterior member, thereby being provided as a product.

However, in recent years, because of demands for lower manufacturing cost, an even thinner device, and the like, elimination of the synthetic resin cabinet is being considered. If the cabinet is eliminated, however, the members such as the chassis, wiring member, and light source driver substrate that were housed in the cabinet in the conventional configuration are exposed to the outside. In order to maintain a simple exterior, it is preferable that the majority of the wiring member be laid out inside of the chassis, and that only an end portion to be connected to the light source driver substrate be led out from the chassis. However, it was difficult to secure a space to accommodate the wiring member inside of the chassis, and in particular, it was difficult to secure such a space while achieving a reduction in width of the outer edge portion, i.e. a narrower frame.

SUMMARY OF THE INVENTION

The present invention was made in view of the above-mentioned situation, and an object thereof is to accommodate the wiring member inside of the display device while achieving a narrower frame.

Means for Solving the Problems

A display device of the present invention includes: a light source; a display panel that conducts display using light from the light source; a light guide plate laid on a side of the display panel opposite to a display surface side, the light guide plate being disposed such that an end face thereof faces the light source; an exterior member constituted of a pair of holding members that sandwich and hold the display panel and the light guide plate from the display surface side and a side opposite thereto, the pair of holding members housing the light source therebetween, the exterior member constituting an exterior of the display device; a fastening member that is disposed in an outer edge portion of the pair of holding members, thereby fastening the pair of holding members to each other, the outer edge portion surrounding the display panel; and a wiring member connected to the light source, wherein a wiring passage through which the wiring member passes is formed in an inner surface of the outer edge portion of one of the pair of the holding members, the wiring passage being corresponding in postion to the fasterning member in a plan view.

In this configuration, the pair of holding members that sandwich the display panel and the light guide plate from the display surface side and the side opposite thereto and that house the light sources therebetween constitutes the exterior member that constitutes the exterior of the display device, and the wiring passage providing for a passage of the wiring member connected to the light sources is formed in the inner surface of one of the pair of holding members. Therefore, it is possible to accommodate the wiring member inside of the display device, and the exterior of the display device can be made simple. On the other hand, the pair of holding members is fastened to each other by the fastening member that is attached to the outer edge portion of the pair of holding members surrounding the display panel.

Because the wiring passage is formed in the inner surface of the outer edge portion of one of the pair of holding members so as to be adjacent to the fastening member in a direction along which the light guide plate and the display panel are stacked, the wiring member that passes through the wiring passage is also adjacent to the fastening member in the direction along which the light guide plate and the display panel are stacked. By having such a positional relationship, it is possible to reduce the width of the outer edge portion as compared with the configuration in which the wiring member is arranged adjacent to the fastening member at the outer side or inner side thereof, for example. This makes this configuration preferable in achieving a narrower frame in the display device. Furthermore, by having such a positional relationship, the fastening member and the wiring member are disposed using a space created by the light guide plate and the display panel stacked together in the thickness direction thereof, which makes it possible to keep the display device thin.

As embodiments of the present invention, the following configurations are preferred.

(1) In the holding member in which the wiring passage is formed, a reinforcement member is attached so as to close an opening of the wiring passage. When the wiring passage is formed in the holding member, the strength of the holding member is possibly lowered, but by providing the reinforcement member in the holding member so as to close the opening of the wiring passage, it is possible to reinforce the strength of the holding member. The reinforcement member that closes the opening of the wiring passage can also prevent the wiring member that passes through the wiring passage from sticking out of the wiring passage.

(2) The wiring passage is formed so as to extend along a wiring path of the wiring member and so as to have an opening along the entire extension direction thereof, and the reinforcement member is formed so as to extend along the wiring passage. With this configuration, because the wiring passage is formed to have an opening along the entire extension direction thereof in the inner surface of the outer edge portion of the holding member, the wiring member can be placed in the wiring passage with ease in the process of installing the wiring member, which makes this process easier. When the wiring passage is formed in the above-mentioned manner, the strength of the holding member would further be reduced, but because the reinforcement member is provided so as to extend along the wiring passage, the reduction in strength of the holding member can be sufficiently made up for. Furthermore, the reinforcement member disposed so as to extend along the wiring passage can prevent the wiring member from sticking out from the wiring passage more reliably.

(3) The fastening member is attached so as to penetrate the outer edge portion of the pair of holding members, and the reinforcement member has a fastening member locking portion that locks the attached fastening member. In this configuration, the fastening member that is attached to the outer edge portion of the pair of holding members so as to penetrate a portion thereof can be locked by the fastening member locking portion, and therefore, it is possible to keep the pair of holding members and the reinforcement member fastened to each other. The holding member having the wiring passage formed therein has a more complex shape than the reinforcement member because of the wiring passage. By providing the fastening member locking portion in the reinforcement member instead of the holding member having such a complex shape, the manufacturing of the holding member can be made easy, which makes this configuration preferable in reducing the manufacturing cost.

(4) The fastening member locking portion protrudes into the wiring passage in the direction along which the reinforcement member is attached to the holding member having the wiring passage formed therein, and the fastening member locking portion is configured such that a relief space for having the wiring member therein is formed between a protrusion end face thereof and the inner surface of the wiring passage. In this configuration, it is possible to prevent the wiring member from being pinched between the reinforcement member and the holding member when the reinforcement member is attached to the holding member after the wiring member is placed in the wiring passage, because the relief space is secured between the inner surface of the wiring passage and the protruding end face of the fastening member locking portion, which protrudes toward the inside of the wiring passage in the direction along which the reinforcement member is attached to the holding member. As a result, it is possible to prevent the wiring members from being damaged and the like in the manufacturing process.

(5) The reinforcement member has a light guide plate supporting portion that is disposed so as to overlap the light guide plate when viewed from the display surface side, the light guide plate supporting portion abutting on a surface of the light guide plate that faces the display panel. With this configuration, by the light guide plate supporting portion of the reinforcement member abutting on the light guide plate, the light guide plate can be supported by being sandwiched between the light guide plate supporting portion and the holding member disposed on a side opposite to the display surface side. This makes it possible to position the light guide plate with respect to the light sources.

(6) The reinforcement member has a holding member supporting portion that is disposed so as to correspond in position to the light guide plate supporting portion when viewed from the display surface side, the holding member supporting portion abutting on a surface of the holding member disposed on the display surface side, of the pair of holding members, the surface facing the light guide plate. With this configuration, by the holding member supporting portion that overlaps the light guide plate supporting portion when viewed from the display surface side, the light guide plate can be supported more firmly, and the holding member disposed on the display surface side can also be supported and reinforced.

(7) A plurality of flexible substrates arranged at intervals along an edge of the display panel are connected to the edge, and in the reinforcement member including the light guide plate supporting portion, a plurality of flexible substrate passages through which the plurality of flexible substrates pass are formed at intervals along the edge of the display panel. With this configuration, although the reinforcement member has a plurality of flexible substrate passages through which a plurality of flexible substrates pass, because the flexible substrate passage are arranged at intervals, the reinforcement member can sufficiently fulfill the reinforcement function for the holding member having the wiring passages and the supporting function for the light guide plate.

(8) The reinforcement member is provided with a positioning buffer member that is disposed outside of the display panel and that abuts on an end face of the display panel. In this configuration, the positioning buffer member disposed outside of the display panel abuts on the end face of the display panel. Therefore, it is possible to position the display panel accurately while absorbing shock, which makes it easier to install the display panel in the manufacturing process.

(9) Of the pair of holding members, the holding member that is disposed on the display surface side has a panel pressing portion that is in parallel with the display surface of the display panel and that presses the display panel, and side walls that protrude from the outer edge portion of the panel pressing portion toward a side opposite to the display surface side and that abut on the holding member disposed on the side opposite to the display surface side. The wiring passage is formed in a protrusion base portion of a side wall, and the fastening member is attached to a protrusion end portion thereof. The reinforcement member is disposed so as to abut on the panel pressing portion and the side wall. In this configuration, the wiring passage is formed in the protruding base portion of the side wall that constitutes a part of the holding member disposed on the display surface side, which allows the fastening member to be attached to the protruding end portion thereof. In this manner, the fastening member is not disposed on the display surface side in the display device, and therefore, it is difficult to see the fastening member from the display surface side. As a result, the exterior of the display device can be made simpler. On the other hand, when the wiring passage is formed in the protrusion base portion of the side wall, the strength of the holding member would be lowered, but because the reinforcement member is disposed so as to abut on the side wall and the panel pressing portion, the reduction in strength of the holding member can be sufficiently made up for.

(10) The wiring passage is formed in the holding member of the pair of holding members that is disposed on the display surface side, and the fastening member is inserted in the outer edge portion of the pair of holding members from the side opposite to the display surface side. With this configuration, the fastening member is disposed on the side opposite to the display surface side in the display device, and therefore, it is difficult to see the fastening member from the display surface side. As a result, the exterior of the display device can be made simpler.

(11) Of the pair of holding members, the holding member that is disposed on a side opposite to the display surface side has a light guide plate receiving portion disposed in parallel with a surface of the light guide plate to receive the light guide plate, and a fastening member attachment portion that extends outwardly from an outer edge of the light guide plate receiving portion so as to allow the fastening member to be disposed therein by penetrating the fastening member attachment portion. The light guide plate receiving portion and the fastening member attachment portion are flush with each other. The holding member that is disposed on the display surface side has the wiring passage formed therein to allow the wiring member to pass through, and the holding member that is disposed on the side opposite to the display surface side has the light guide plate receiving portion and the fastening member attachment portion that are flush with each other. This makes it possible to achieve a flat shape as a whole. As a result, the manufacturing cost for the holding member disposed on the side opposite to the display surface side is reduced, and this configuration is preferable in achieving a thinner display device.

(12) Of the pair of holding members, the holding member that is disposed on the side opposite to the display surface side has a wiring line thru-hole formed therein, the wiring thru-hole being continued to the wiring passage and being used to guide the wiring member out of the holding member. A light source driver substrate connected to the wiring member led out through the wiring thru-hole to drive the light sources and a cover member that is disposed so as to cover the light source driver substrate and the wiring member led out through the wiring thru-hole are attached to the holding member having the wiring thru-hole. In this configuration, the wiring member connected to the light sources that are housed between the holding members is guided to the outside through the wiring thru-hole formed in the holding member disposed on the side opposite to the display surface side, and the wiring member is connected to the light source driver substrate, thereby making it possible for the light source driver substrate to drive the light sources. By covering the wiring member led out through the wiring thru-hole by the cover member together with the light source driver substrate, the light source driver substrate and the wiring member are prevented from being exposed to the outside, and as a result, the exterior of the display device can be made simpler.

(13) A plurality of the light sources are disposed on at least two sides across the light guide plate. The wiring passages are formed so as to open toward the plurality of light sources disposed at the respective two sides, and the wiring thru-hole, the light source driver substrate, and the cover member are located closer to one of the respective sides where the plurality of light sources are disposed. In this configuration, the wiring members connected to the respective light sources disposed on at least the two sides across the light guide plate pass through the wiring passages that open toward the light sources on the respective sides, and are led to the wiring thru-hole that is located closer to one of the respective sides where the light sources are disposed. Because the wiring thru-hole, light source driver substrate, and cover member are disposed in a position that is closer to one of the respective sides where the plurality of light sources are arranged, the sizes of the light source driver substrate and the cover member attached to the holding member, which is an exterior member, can be maintained small, and therefore, it is possible to make the exterior of the display device even simpler.

Effects Of The Invention

According to the present invention, the wiring members can be accommodated inside of the display device while achieving a narrower frame.

DETAILED DESCRIPTION OF EMBODIMENTS

<Embodiment >1

Figure 3:
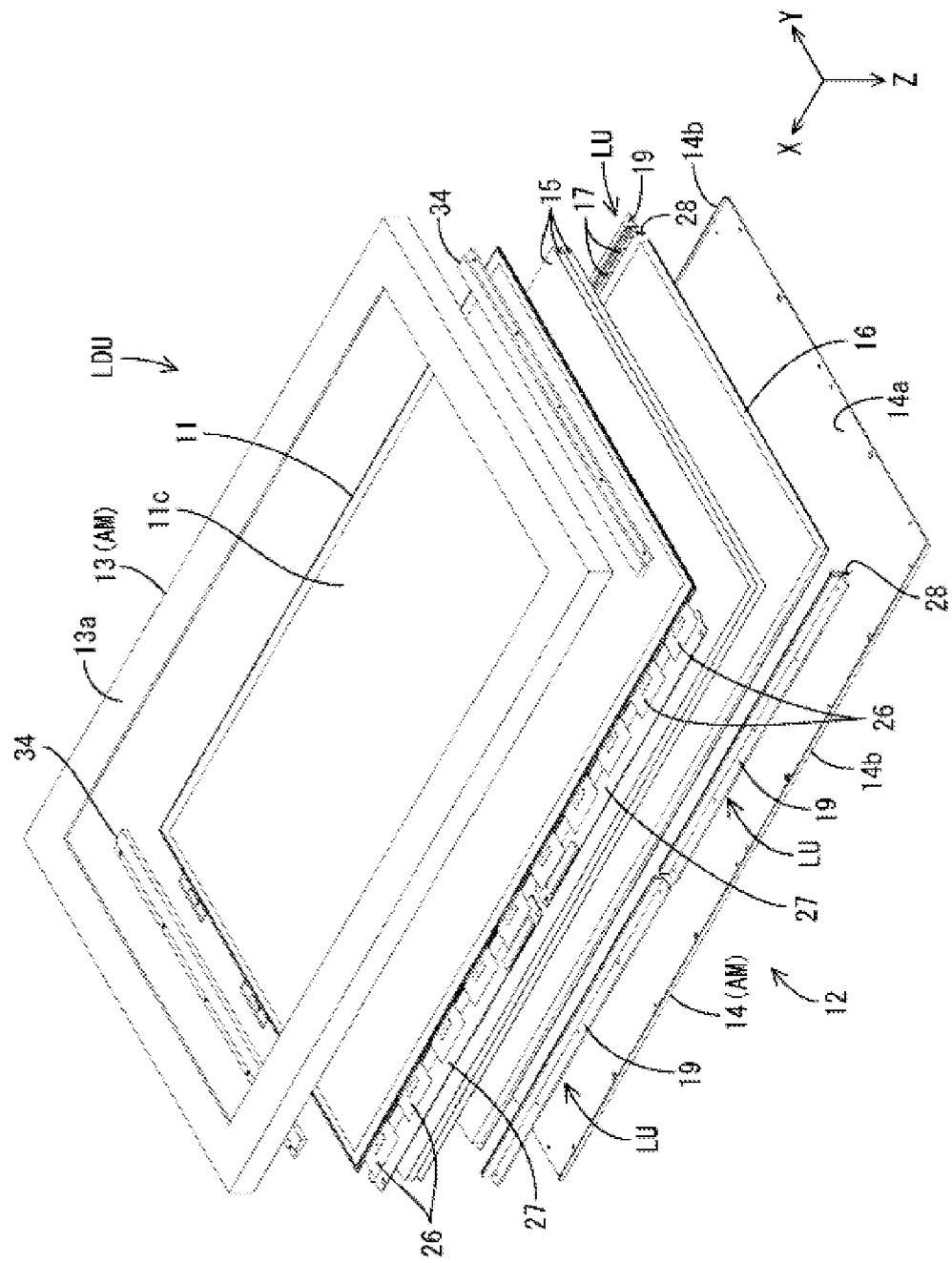
FIG. 3 is an exploded perspective view showing a schematic configuration of a liquid crystal display unit that constitutes a part of the liquid crystal display device.
Figure 4:
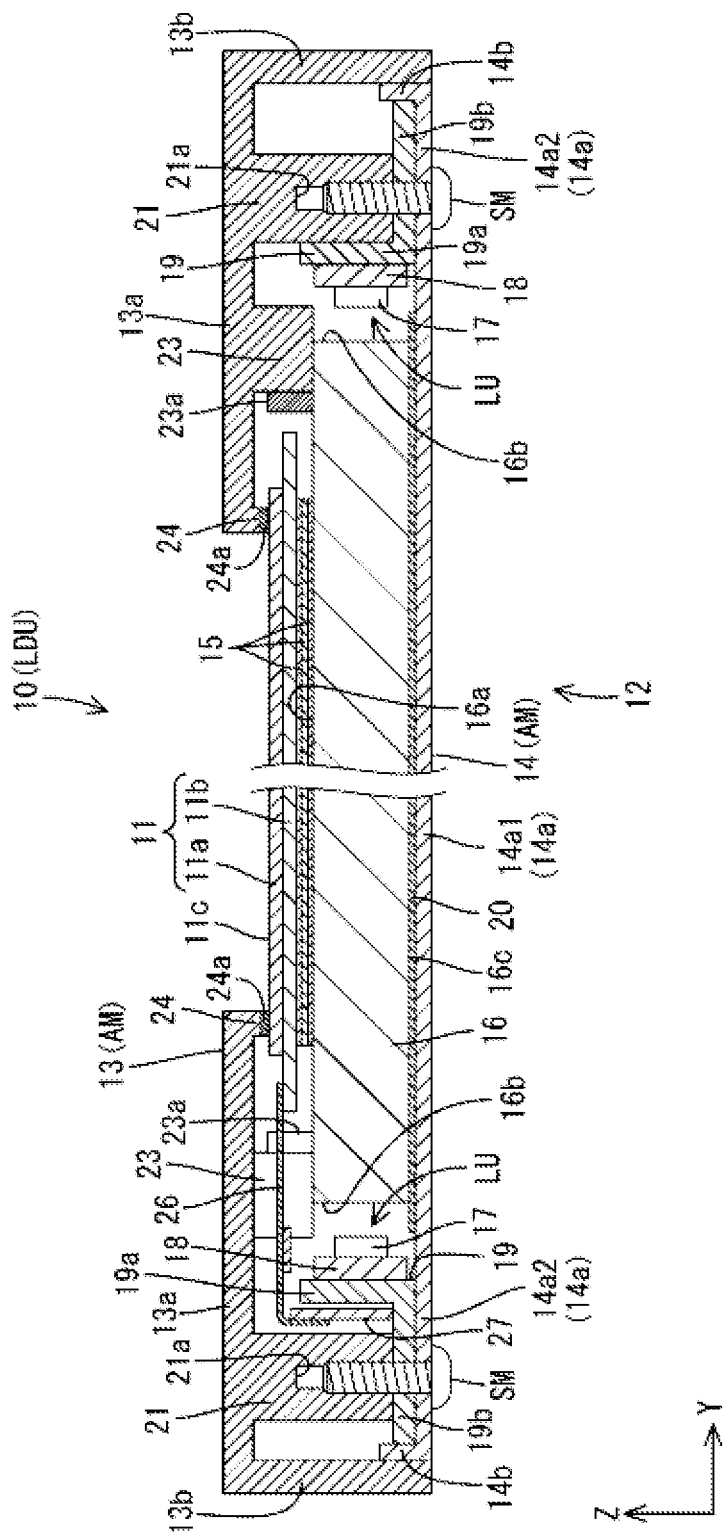
FIG. 4 is a cross-sectional view that shows a cross-sectional configuration of the liquid crystal display device along the shorter side direction.

Embodiment 1 of the present invention will be described with reference to FIGS. 1 to 14. In the present embodiment, a liquid crystal display device 10 will be described as an example. The drawings indicate an X axis, a Y axis, and a Z axis in a portion of the drawings, and each of the axes indicates the same direction for the respective drawings. The upper side of FIG. 4 is the front side, and the lower side is the rear side.

Figure 1:
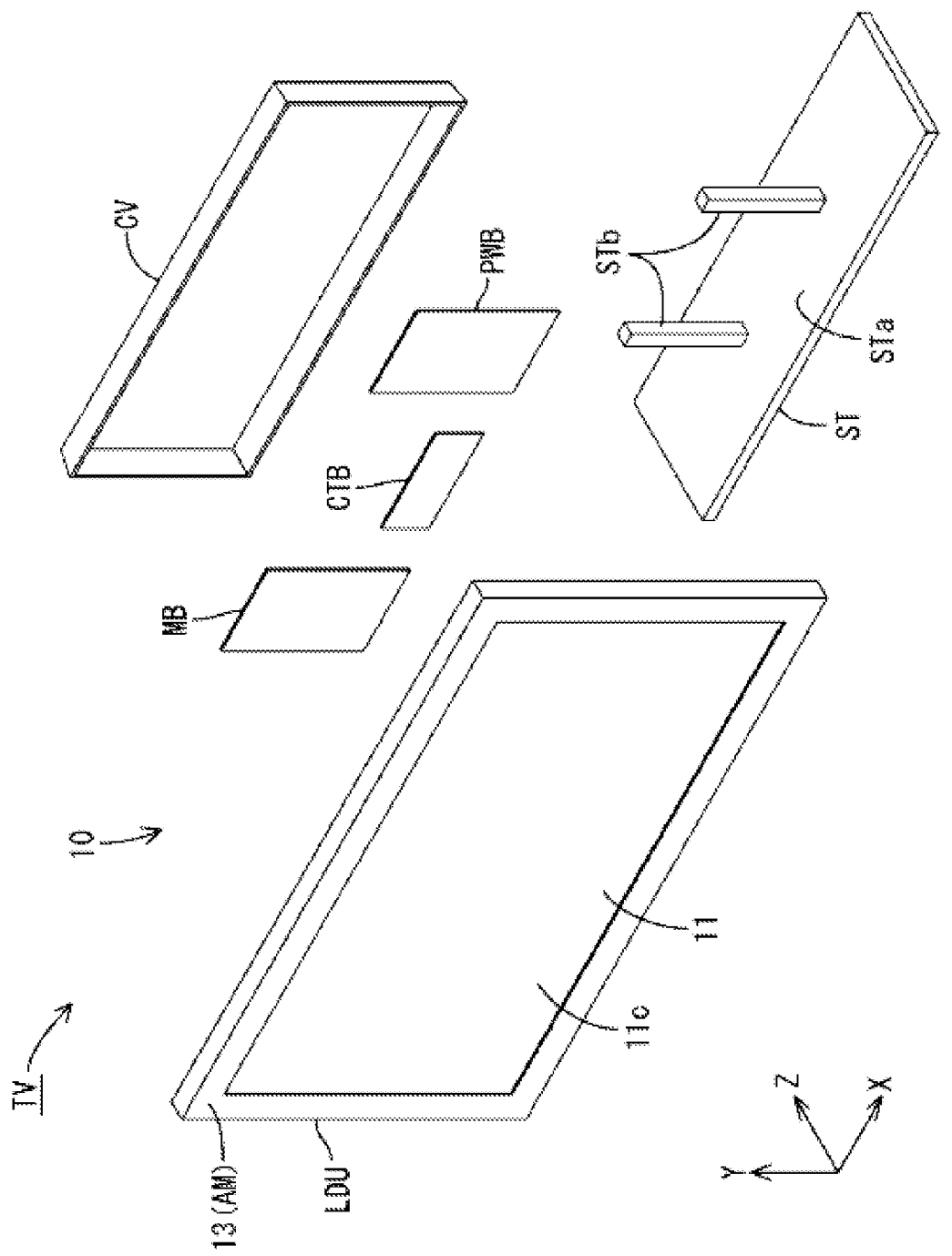
FIG. 1 is an exploded perspective view that shows a schematic configuration of a television receiver and a liquid crystal display device according to Embodiment 1 of the present invention.

As shown in FIG. 1, a television receiver TV of the present embodiment includes: a liquid crystal display unit (display unit) LDU; various boards PWB, MB, and CTB that are attached to the back side (rear side) of the liquid crystal display unit LDU; a cover member CV attached to the rear side of the liquid crystal display unit LDU so as to cover the various boards PWB, MB, and CTB; and a stand ST. The television receiver TV is supported by the stand ST such that the display surface of the liquid crystal display unit LDU is parallel to the vertical direction (Y axis direction). The liquid crystal display device 10 of the present embodiment is obtained by removing at least the configuration for receiving television signals (such as a tuner part of the main board MB) from the television receiver TV having the above-mentioned configuration. As shown in FIG. 3, the liquid crystal display unit LDU is formed to be a horizontally-long quadrangle (rectangular shape) as a whole, and includes a liquid crystal panel 11 that is a display panel, and a backlight device (illumination device) 12 that is an external light source. The liquid crystal panel 11 and the backlight device 12 are held as one component by a frame (holding member disposed on the display surface 11c side, first holding member) 13 and a chassis (holding member disposed on a side opposite to the display surface 11c side, second holding member) 14 that are an exterior member AM constituting the exterior of the liquid crystal display device 10. The chassis 14 of the present embodiment constitutes a part of the exterior member AM and also a part of the backlight device 12.

Figure 2:
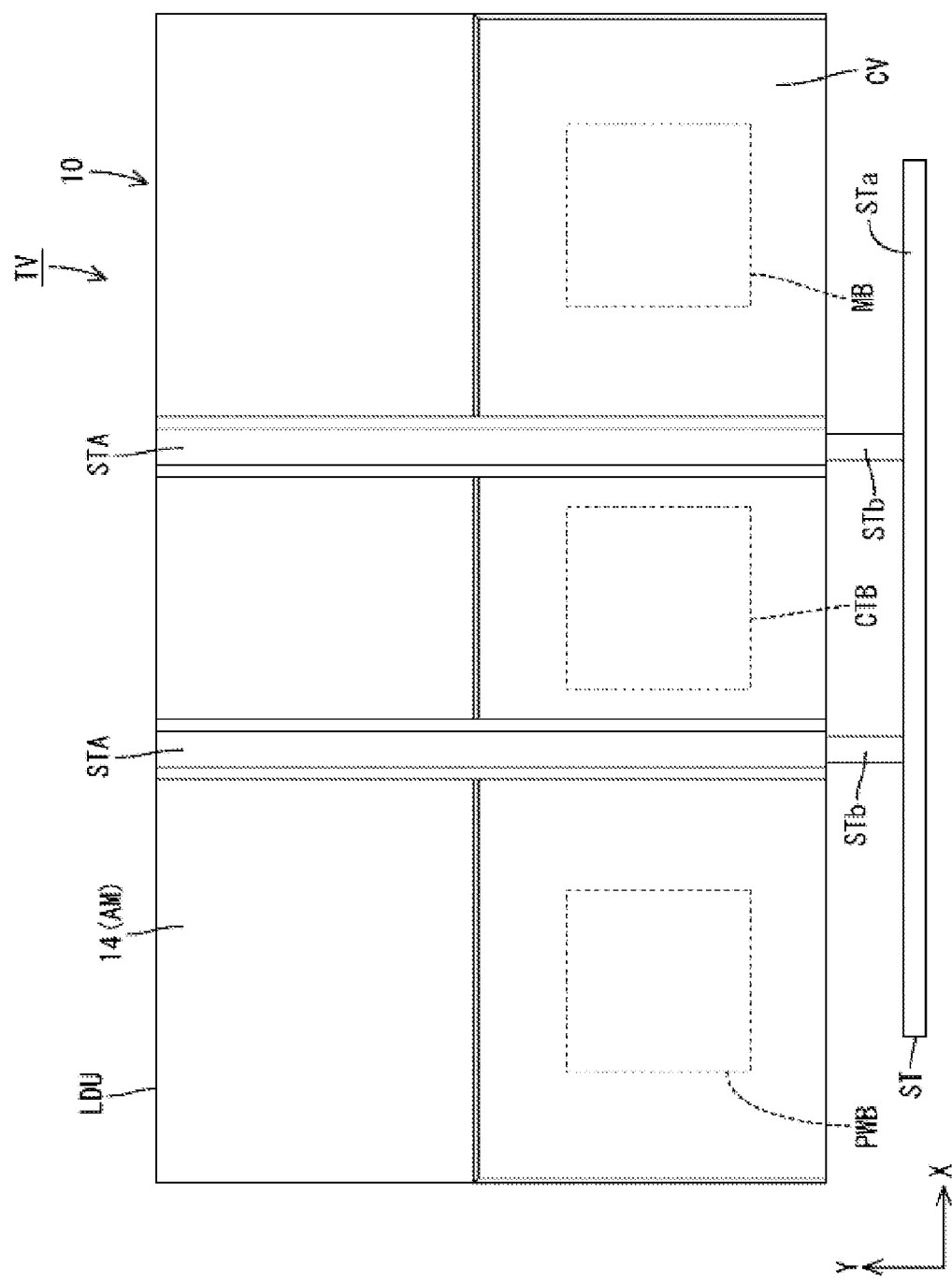
FIG. 2 is a rear view of the television receiver and the liquid crystal display device.

First, the configuration of the rear side of the liquid crystal display device 10 will be explained. As shown in FIG. 2, on the rear side of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA is a substantially channel shape that opens toward the chassis 14, and a pair of support columns STb of the stand ST is inserted into spaces formed between the stand attachment members STA and the chassis 14, respectively. The stand ST is constituted of a base STa that is disposed in parallel with the X axis direction and the Z axis direction, and a pair of support columns STb standing on the base STa along the Y axis direction. The cover member CV is made of a synthetic resin, and is attached so as to cover a portion of the rear surface of the chassis 14, or more specifically, a lower part in the vertical direction of the rear surface of the chassis 14 (a lower half in FIG. 2), while crossing over the pair of stand attachment members STA along the X axis direction. That is, the cover member CV is disposed in a position that is closer to one end of the liquid crystal display device 10 in the shorter side direction (Y axis direction). Between the cover member CV and the chassis 14, a component housing space is provided to house the components mentioned below such as various boards PWB, MB, and CTB. Thus, the components housed in the cover member CV such as various boards PWB, MB, and CTB are disposed closer to the one end of the liquid crystal display device 10 in the shorter side direction.

As shown in FIG. 2, the various boards PWB, MB, and CTB include a power supply board PWB, a main board MB, and a control board CTB. The power supply board PWB is a power source for the liquid crystal display device 10, and can supply driving power to other boards MB and CTB, LEDs 17 of the backlight device 12, and the like. Therefore, the power supply board PWB doubles as an LED driver substrate that drives the LEDs 17 (light source driver substrate). The wiring configuration to electrically connect the power supply board PWB to the LEDs 17 will be explained in detail below. The main board MB at least has a tuner part that can receive television signals, and an image processing part that conducts image-processing on the received television signals (neither the tuner part or the image processing part is shown in the figure), and can output the processed image signals to the control board CTB described below. When the liquid crystal display device 10 is connected to a not-shown external video playback device, an image signal from the video playback device is inputted into the main board MB, and the main board MB can output the image signal to the control board CTB after processing the signal at the image processing part. The control board CTB has the function of converting the image signal inputted from the main board MB to a signal for driving liquid crystal and supplying the converted signal for liquid crystal to the liquid crystal panel 11.

As shown FIG. 3, in the liquid crystal display unit LDU that constitutes a part of the liquid crystal display device 10, main constituting components thereof are housed in a space formed between the frame (front frame) 13 that constitutes the front exterior, and the chassis (rear chassis) 14 that constitutes the rear exterior. The main constituting components housed between the frame 13 and the chassis 14 at least include the liquid crystal panel 11, optical members 15, a light guide plate 16, and an LED unit (light source unit) LU. Among them, the liquid crystal panel 11, the optical members 15, and the light guide plate 16 are stacked on top of the other, and are held by being sandwiched by the frame 13 disposed on the front side and the chassis 14 disposed on the rear side. The backlight device 12 is constituted of the optical members 15, the light guide plate 16, the LED units LU, and the chassis 14, and is the configuration that is obtained by removing the liquid crystal panel 11 and the frame 13 from the liquid crystal display unit LDU described above. Two pairs of LED units LU, which constitute a part of the backlight device 12, are arranged along the longer side direction (X axis direction) of the light guide plate 16, and each pair is disposed at the respective sides across the light guide plate 16 in the shorter side direction (Y axis direction), that is, a total of four LED units LU are provided between the frame 13 and the chassis 14. The LED unit LU is constituted of the LEDs 17, which are the light sources, an LED substrate (light source substrate) 18 on which the LEDs 17 are mounted, and a heat-dissipating member (heat spreader, light source attachment member) 19 to which the LED substrate 18 is attached. The respective constituting components will be explained below.

As shown in FIG. 3, the liquid crystal panel 11 is formed in a horizontally-long quadrangular shape (rectangular shape) in a plan view, and is configured by bonding a pair of glass substrates having high light transmittance to each other with a prescribed gap therebetween, and by injecting liquid crystal between the two substrates. Of the two substrates 11a and 11b, one on the front side (front surface side) is a CF substrate 11a, and the other on the rear side (rear surface side) is an array substrate 11b. In the array substrate 11b, switching elements (TFTs, for example) connected to source wiring lines and gate wiring lines that are intersecting with each other, pixel electrodes connected to the switching elements, an alignment film, and the like are provided. On the other hand, in the CF substrate 11a, color filters having respective colored portions such as R (red), G (green), and B (blue) arranged in a prescribed pattern, an opposite electrode, an alignment film, and the like are provided. Polarizing plates (not shown) are respectively provided on outer sides of the two substrates 11a and 11b.

As shown in FIG. 4, of the pair of substrates 11a and 11b that constitutes a part of the liquid crystal panel 11, the array substrate 11b is formed larger than the CF substrate 11 in a plan view, and is disposed such that an edge portion thereof protrudes toward the outside beyond the CF substrate 11a. Of the pair of longer side edges in the array substrate 11b, at the longer side edge closer to the control board CTB in the Y axis direction (left edge of FIG. 4), a plurality of terminals that are led out from the gate wiring lines and source wiring lines are provided, and as shown in FIGS. 2 and 4, the respective terminals are connected to flexible substrates 26 on which drivers DR for driving liquid crystal are mounted, respectively. A plurality of flexible substrates 26 are arranged at intervals in a direction along the longer side edge of the array substrate 11b, or in other words, in the X axis direction, and protrude from the longer side edge of the array substrate 11b toward the outside along the Y axis direction. The flexible substrate 26 has a film-shaped base member made of a synthetic resin material having insulating properties and flexibility (such as a polyimide resin) and a plurality of wiring patterns (not shown) formed on the base member, and the wiring patterns are connected to a driver DR mounted near the center of the base member. One end of the flexible substrate 26 is crimp-connected to terminals of the array substrate 11b, and the other end thereof is crimp-connected to terminals of a printed board 27, which will be explained later, through anisotropic conductive films (ACF), respectively. The printed board 27 is connected to the above-mentioned control board CTB through a not-shown FPC or the like, and can transfer signals inputted from the control board CTB to the flexible substrates 26. This way, in the liquid crystal panel 11, an image is displayed on the display surface 11c based on the signals inputted from the control board CTB.

As shown in FIG. 4, the liquid crystal panel 11 is stacked on the front side of the optical members 15 described below, and the rear surface thereof (outer surface of a polarizing plate on the rear side) is in close contact with the optical members 15 with almost no gap. With this configuration, it is possible to prevent dust from entering a space between the liquid crystal panel 11 and the optical members 15. The display surface 11c of the liquid crystal panel 11 is constituted of a display region that is in the center of the surface and that can display images, and a non-display region that is in the outer edges of the surface and that is formed in a frame shape surrounding the display region. The terminals and the flexible substrates 26 are disposed in the non-display region.

As shown in FIG. 3, the optical members 15 have a horizontally-long quadrangular shape in a plan view as in the liquid crystal panel 11, and the size thereof (shorter side dimension and longer side dimension) is the same as that of the liquid crystal panel 11. The optical members 15 are stacked on the front side (side from which light is emitted) of the light guide plate 16 described below, and are sandwiched between the liquid crystal panel 11 described above and the light guide plate 16. Each of the optical members 15 is a sheet-shaped member, and the optical members 15 are constituted of three sheets stacked together. Specific types of optical members 15 include a diffusion sheet, a lens sheet, a reflective polarizing sheet, and the like, for example, and it is possible to appropriately choose any of these as optical members 15.

Figure 5:
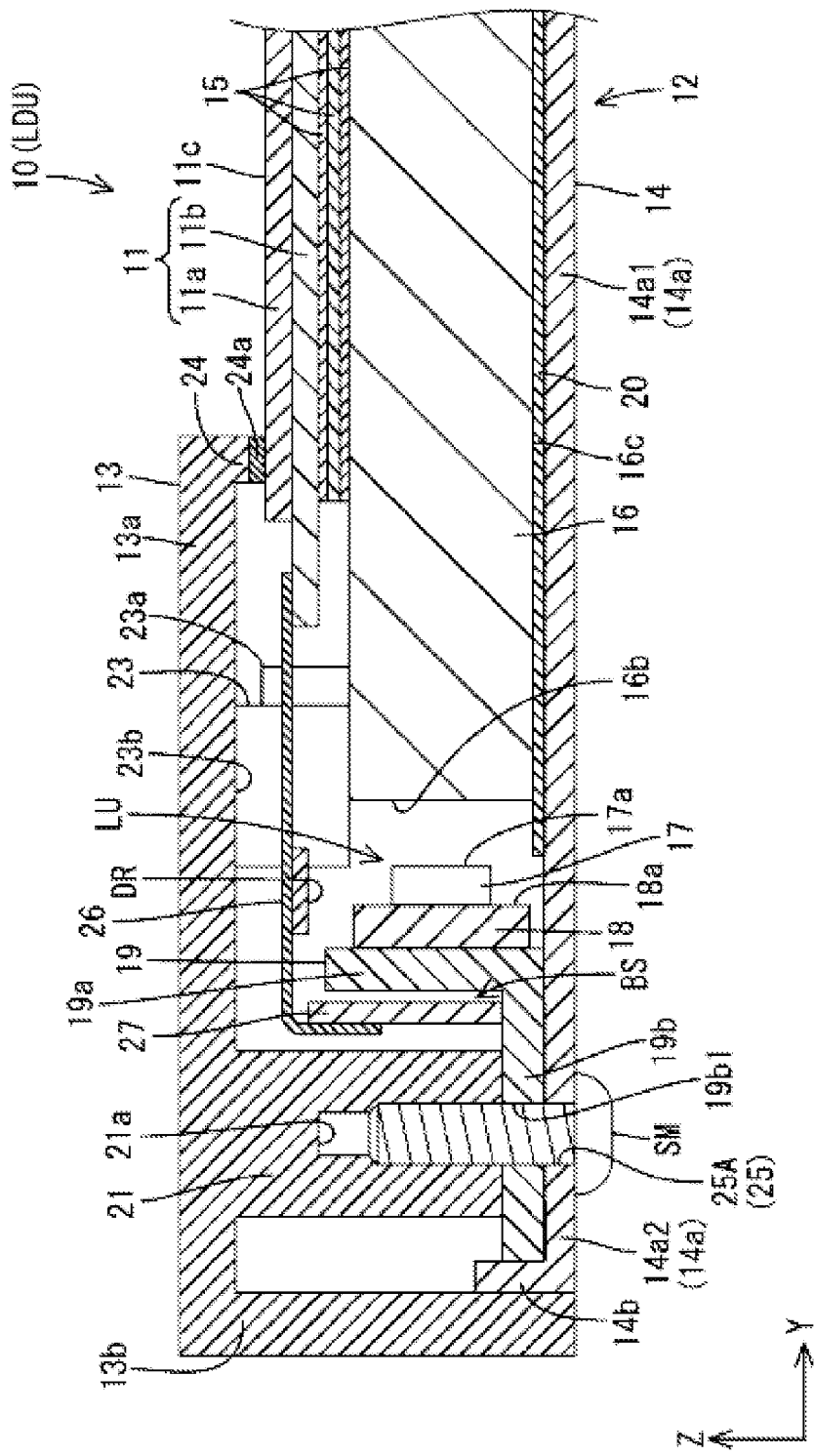
FIG. 5 is an enlarged cross-sectional view showing a cross-sectional configuration of the liquid crystal display device along the shorter side direction, the figure illustrating a cutting portion of a flexible substrate.

The light guide plate 16 is made of a synthetic resin (an acrylic resin such as PMMA or a polycarbonate, for example) with a higher refractive index than air and almost completely transparent (excellent light transmission). As shown in FIGS. 3 and 5, the light guide plate 16 has a horizontally-long quadrangular shape in a plan view, in a similar manner to the liquid crystal panel 11 and the optical members 15, and is in a plate-shape that is thicker than the optical members 15. The longer side direction on the main surface of the light guide plate matches the X axis direction, the shorter side direction matches the Y axis direction, and the thickness direction intersecting the main surface matches the Z axis direction. The light guide plate 16 is placed on the rear side of the optical members 15, and is sandwiched between the optical members 15 and the chassis 14. As shown in FIG. 4, in the light guide plate 16, at least the shorter side dimension thereof is greater than the respective shorter side dimensions of the liquid crystal panel 11 and the optical members 15, and the light guide plate 16 is disposed such that respective edges in the shorter side direction (respective edges along the longer side direction) protrude toward outside beyond respective edges of the liquid crystal panel 11 and the optical members 15 (so as not to overlap in a plan view). The light guide plate 16 has a pair of LED units LU disposed at respective sides in the shorter side direction, thereby being interposed therebetween in the Y axis direction, and light from the LEDs 17 enters the respective shorter side edges of the light guide plate 16. The light guide plate 16 has the function of guiding therethrough the light of LEDs 17 that entered from the respective shorter side edges and emitting the light toward the optical members 15 (front side).

Of the main surfaces of the light guide plate 16, the surface facing the front side (surface facing the optical members 15) is a light-emitting surface 16a that emits light from the interior toward the optical members 15 and the liquid crystal panel 11. Of the outer end faces continued from the main surfaces of the light guide plate 16, two end faces on the longer sides that are longer in the X axis direction (two end faces at the respective edges in the shorter side direction) respectively face the LEDs 17 (LED substrates 18) with a prescribed space therebetween, and these two end faces are a pair of light-receiving surfaces 16b through which light from the LEDs 17 enters. The light-receiving surfaces 16b are on a plane parallel to that defined by the X axis direction and the Z axis direction (main surface of the LED substrate 18), and are substantially perpendicular to the light-emitting surface 16a. The direction along which the LEDs 17 and the light-receiving surfaces 16b are aligned with respect to each other is the same as the Y axis direction, and is parallel to the light-emitting surface 16a.

As shown in FIG. 4, on the rear side of the light guide plate 16, or in other words, on a surface 16c that is opposite to the light output surface 16a (surface facing the chassis 14), a light guide reflective sheet 20 is disposed so as to cover almost the entire area of the surface 16c. The light guide reflective sheet 20 can reflect light, which exited out from the surface 16c toward the rear side, back to the front side. In other words, the light guide reflective sheet 20 is sandwiched between the chassis 14 and the light guide plate 16. The light guide reflective sheet 20 is made of a synthetic resin, and the surface thereof is a highly reflective white. The shorter side dimension of the light guide reflective sheet 20 is greater than the shorter side dimension of the light guide plate 16, and the respective edges thereof protrude beyond the light-receiving surfaces 16b toward the LEDs 17. With the protruding members of the light guide reflective sheet 20, light that travels diagonally from the LEDs 17 toward the chassis 14 can be reflected efficiently, thereby directing the light toward the light-receiving surfaces 16b of the light guide plate 16. On at least one of the light output surface 16a and the opposite surface 16c of the light guide plate 16, a reflective portion (not shown) that reflects light from the interior or a diffusion portion (not shown) that diffuses light from the interior is patterned so as to have a prescribed in-plane distribution, thereby controlling light outputted from the light-emitting surface 16a to have an even distribution in the plane.

Next, configurations of the LEDs 17, the LED substrates 18, and the heat dissipating members 19 that constitute the LED unit LU will be explained in this order. As shown in FIGS. 3 and 4, the LEDs 17 of the LED units LU have a configuration in which an LED chip is sealed with a resin on a substrate part that is affixed to the LED substrate 18. The LED chip mounted on the substrate part has one type of primary light-emitting wavelength, and specifically, only emits blue light. On the other hand, the resin that seals the LED chip has a fluorescent material dispersed therein, the fluorescent material emitting light of a prescribed color by being excited by the blue light emitted from the LED chip. This combination of the LED chip and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. Each of the LEDs 17 is of a so-called top-emitting type in which the side opposite to that mounted onto the LED substrate 18 (side facing the light-receiving surface 16b of the light guide plate 16) is the primary light-emitting surface.

Figure 7:
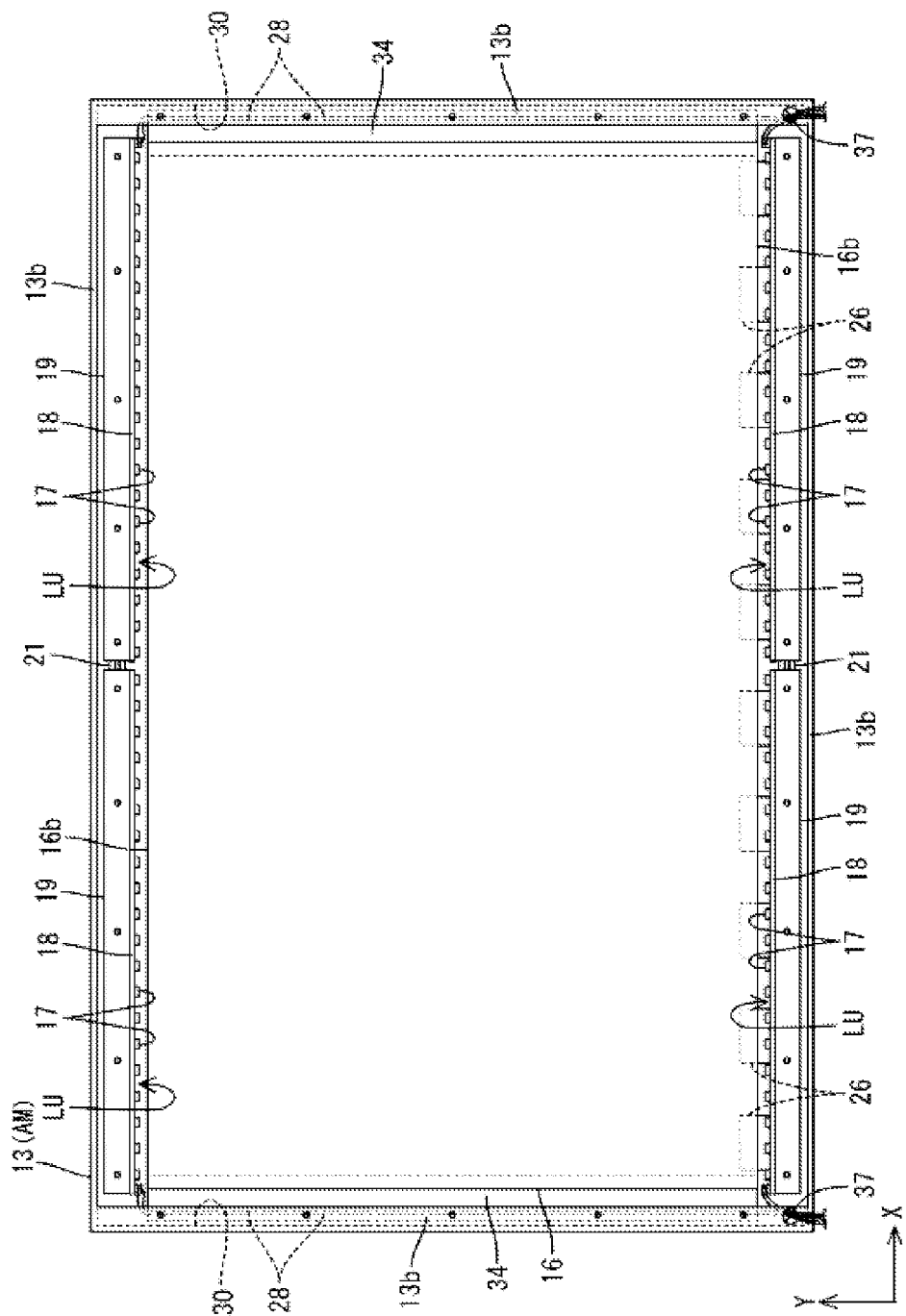
FIG. 7 is a rear view of the liquid crystal display device from which a chassis is removed.

As shown in FIGS. 3, 4 and 7, the LED substrates 18 of the LED units LU are each formed in a narrow plate shape that extends along the longer side direction (X axis direction, longitudinal direction of the light-receiving surface 16b) of the light guide plate 16, and are housed between the frame 13 and the chassis 14 such that each main surface thereof is parallel to the X axis direction and the Z axis direction, or in other words, in parallel with the light-receiving surfaces 16b of the light guide plate 16. The length dimension of the LED substrate 18 is about half of the longer side dimension of the light guide plate 16. On the inner main surfaces of the respective LED substrates 18, or in other words, on the surfaces facing the light guide plate 16 (surfaces opposing the light guide plate 16), the LEDs 17 having the above-mentioned configuration are mounted, and these surfaces are mounting surfaces 18a. On the respective mounting surfaces 18a of the LED substrates 18, a plurality of LEDs 17 are arranged in a row (in a line) along the length direction (X axis direction) at prescribed intervals. That is, a plurality of LEDs 17 are arranged at intervals along the longer side direction on the respective longer edges of the backlight device 12. The intervals between respective adjacent LEDs 17 along the X axis direction are substantially equal to each other, or in other words, the LEDs 17 are arranged at substantially the same pitch. The arrangement direction of the LEDs 17 corresponds to the length direction (X axis direction) of the LED substrates 18. Because the pair of LED substrates 18 disposed across the light guide plate 16 is housed between the frame 13 and the chassis 14 such that the respective mounting surfaces 18a for the LEDs 17 face each other, the primary light-emitting surfaces of the respective LEDs 17 that are mounted on the respective LED substrates 18 of each pair face each other, and the optical axis of each LED 17 substantially coincides with the Y axis direction. The base member of the LED substrate 18 is made of a metal such as aluminum, for example, and the above-described wiring pattern (not shown) is formed on the surface via an insulating layer. The base member of the LED substrate 18 may alternatively be formed of an insulating material such as ceramics.

Figure 8:
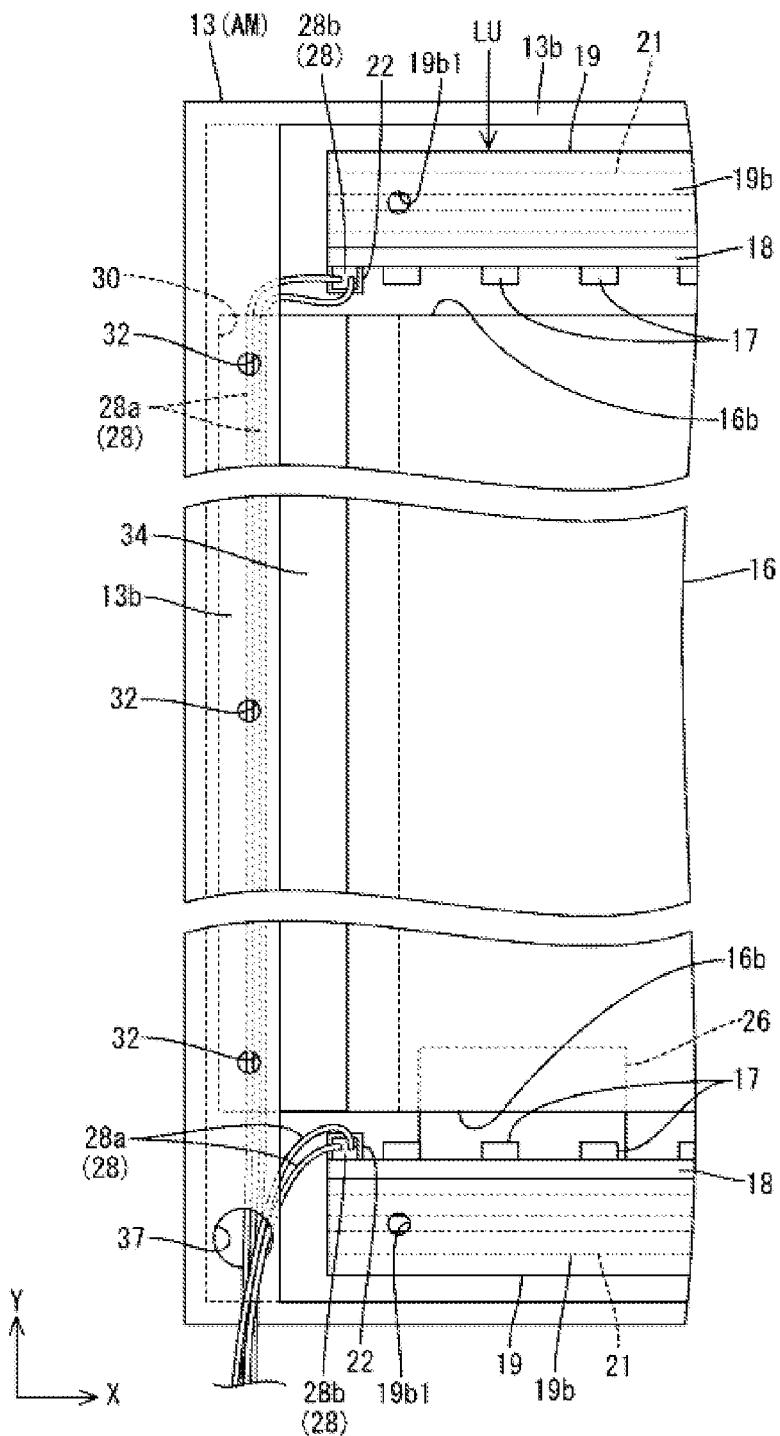
FIG. 8 is an enlarged view of the rear view of FIG. 7.

As shown in FIGS. 7 and 8, on the mounting surface of the LED substrate 18, the wiring pattern (not shown) that extends along the lengthwise direction (X axis direction), or in other words, along the direction in which the LEDs 17 are arranged, and that is connected to the respective LEDs 17 is formed. A substrate connector 22 is also mounted on the mounting surface at an end of the wiring pattern. That is, the LED substrate 18 is a one-side mounting type in which the LEDs 17, the substrate connector 22, and the like are mounted only on one of the main surfaces thereof. The substrate connector 22 is disposed at one of the two ends of the LED substrate 18 in the lengthwise direction, and more specifically, at an outer end (that is adjacent to a shorter side portion of the frame 13) of the longer side direction of the frame 13 and the light guide plate 16. Therefore, near four corners of the frame 13, respective substrate connectors 22 of the four LED substrates 18 are respectively disposed. The substrate connector 22 is constituted of a connector housing made of a resin and formed in a substantially tube shape, and an anode terminal and cathode terminal (not shown) made of a metal and housed in the connector housing. A wiring connector 28b disposed at an end of the wiring member 28, which will be described below, can be inserted into the connector housing. By connecting the wiring member 28 to the power supply board PWB described above, driving power can be supplied to the LEDs 17. The wiring pattern extends along the longer side direction of the LED substrate 18 and turns around thereon. More specifically, a portion of the wiring pattern extending from the first end that is connected to the anode terminal of the substrate connector 22 crosses over the respective adjacent LEDs 17 and is connected to anode terminals and cathode terminals (not shown) of the respective LEDs 17, thereby connecting the group of LEDs 17 to each other in series. When the wiring pattern reaches an end opposite to the substrate connector 22 on the LED substrate 18, the wiring pattern turns around and extends straight toward the substrate connector 22. The second end, which is the end of the extending portion, is connected to the cathode terminal of the substrate connector 22.

As shown in FIGS. 3, 4, and 7, the heat-dissipating member 19 of the LED unit LU is made of a metal such as aluminum, for example, that has excellent heat conductivity. The heat-dissipating member 19 is constituted of an LED attachment portion (light source attachment portion) 19a to which the LED substrate 18 is attached, and a heat-dissipating portion 19b that makes surface-to-surface contact with the plate surface of the chassis 14, and these two portions form a bent shape having a substantially L-shaped cross section. The length dimension of the heat-dissipating member 19 is substantially the same as the length dimension of the LED substrate 18. The LED attachment portion 19a of the heat-dissipating member 19 is in a plate shape that runs parallel to the surface of the LED substrate 18 and the light-receiving surface 16b of the light guide plate 16, and the longer side direction corresponds to the X axis direction, the shorter side direction corresponds to the Z axis direction, and the thickness direction corresponds to the Y axis direction, respectively. On the inner surface of the LED attachment portion 19a, or in other words, on the surface that faces the light guide plate 16, the LED substrate 18 is attached. While the longer side dimension of the LED attachment portion 19a is substantially the same as the longer side dimension of the LED substrate 18, the shorter side dimension of the LED attachment portion 19a is slightly greater than the shorter side dimension of the LED substrate 18. The outer surface of the LED attachment portion 19a, that is, the surface opposite to the surface on which the LED substrate 18 is attached faces a protruding member 21 of the frame 13, which will be later described. That is, the LED attachment portion 19a is interposed between the protruding member 21 of the frame 13 and the light guide plate 16. The LED attachment portion 19a makes surface-to-surface contact with the protruding member 21, and in this manner, heat generated from the LEDs 17 due to illumination can be transferred to the frame 13 having the protruding member 21 through the LED substrate 18 and the LED attachment portion 19a, and can be dissipated therefrom. The LED attachment portion 19a is configured to rise from the inner edge, or in other words, the edge closer to the LEDs 17 (light guide plate 16) of the heat-dissipating portion 19b described below toward the front side, or toward the frame 13 along the Z axis direction.

Figure 6:
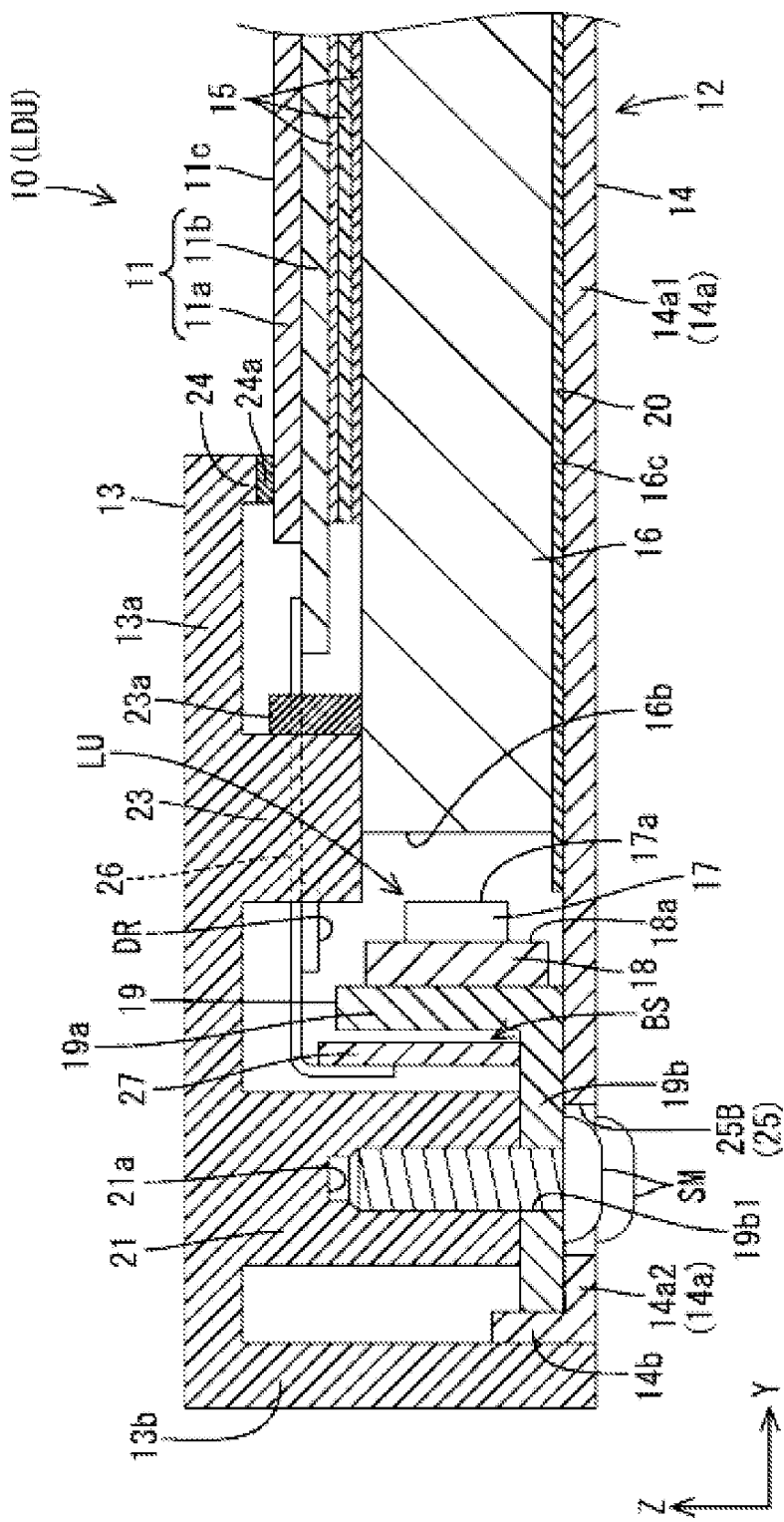
FIG. 6 is an enlarged cross-sectional view showing a cross-sectional configuration of the liquid crystal display device along the shorter side direction, the figure illustrating a cutting portion of a light guide plate supporting portion.

As shown in FIGS. 3 and 4, the heat-dissipating portion 19b is formed in a plate shape that is parallel to the surface of the chassis 14, and the long side direction corresponds to the X axis direction, the shorter side direction corresponds to the Y axis direction, and the thickness direction corresponds to the Z axis direction, respectively. The rear surface of the heat-dissipating portion 19b, or in other words, the surface facing the chassis 14, is entirely in contact with the surface of the chassis 14. In this way, heat generated from the LEDs 17 due to illumination can be transferred to the chassis 14 through the LED substrate 18, the LED attachment portion 19a, and the heat-dissipating portion 19b, and can be dissipated therefrom. The longer side dimension of the heat-dissipating portion 19b is substantially the same as that of the LED attachment portion 19a. The front surface of the heat dissipating portion 19b, or in other words, the surface opposite to the side that is in contact with the chassis 14 faces the protruding member 21 of the frame 13, which will be later described. That is, the heat-dissipating portion 19b is interposed between the protruding member 21 of the frame 13 and the chassis 14. The heat-dissipating portion 19b makes surface-to-surface contact with not only the chassis 14, but also the protruding member 21, and heat from the LEDs 17 can thereby be transferred to the frame 13 having the protruding member 21. Then, as shown in FIGS. 5 and 6, the heat-dissipating portion 19b is configured to be affixed to the protruding member 21 by a screw SM, and has a thru-hole 19b1 through which the screw SM pass. The heat-dissipating portion 19b protrudes from the rear edge of the LED attachment portion 19a, or in other words, the edge closer to the chassis 14 toward the outside, or in other words, in the direction opposite to the light guide plate 16.

Next, the configurations of the frame 13 and the chassis 14 that constitute the exterior member AM will be explained. The frame 13 and the chassis 14 are both made of a metal such as aluminum, for example, and have higher mechanical strength (rigidity) and heat conductivity as compared with the case in which the frame 13 and the chassis 14 are made of a synthetic resin. As shown in FIG. 3, the frame 13 and the chassis 14 hold the liquid crystal panel 11, the optical members 15, and the light guide plate 16, which are stacked on top of the other, by sandwiching these stacked components from the front side and the rear side, while housing pairs of LED units LU on the respective edges in the shorter side direction.

As shown in FIG. 3, the frame 13 is formed in a horizontally-long frame shape as a whole so as to surround the display region on the display surface 11c of the liquid crystal panel 11. The frame 13 is constituted of a panel pressing portion 13a that is disposed in parallel with the display surface 11c of the liquid crystal panel 11 and that presses the liquid crystal panel 11 from the front side, and side walls 13b that protrude from the outer edges of the panel pressing portion 13a toward the rear side, and has a substantially L-shaped cross portion. The panel pressing portion 13a is formed in a horizontally-long frame shape as in the outer edge portion (non-display region, frame portion) of the liquid crystal panel 11, and can press almost the entire outer edge portion of the liquid crystal panel 11 from the front side. The panel pressing portion 13a is made to be wide enough to cover not only the outer edge portion of the liquid crystal panel 11, but also the outer edge portion of the light guide plate 16 that are located outside of the outer edge portion of the liquid crystal panel 11 in the radiation direction and the respective LED units LU from the front side. The front outer surface of the panel pressing portion 13a (surface opposite to the side facing the liquid crystal panel 11) is exposed to the outside on the front side of the liquid crystal display device 10 as in the display surface 11c of the liquid crystal panel 11, and constitutes the front side of the liquid crystal display device 10 together with the display surface 11c of the liquid crystal panel 11. On the other hand, the side walls 13b take the form of a substantially angular enclosure that rises from the outer edges of the panel pressing portion 13a toward the rear side. The side walls 13b can enclose the liquid crystal panel 11, the optical members 15, the light guide plate 16, and the LED units LU that are housed therein along almost the entire periphery thereof, and also can enclose the chassis 14 on the rear side along almost the entire periphery thereof. The outer surfaces of the side walls 13b along the circumference direction of the liquid crystal display device 10 are exposed to the outside in the circumference direction of the liquid crystal display device 10, and constitute the top face, the bottom face, and the side faces of the liquid crystal display device 10.

As shown in FIG. 4, in a pair of longer side portions of the panel pressing portion 13a having a horizontally-long frame shape, protruding members 21 for attaching the LED units LU are integrally formed inside of the side walls 13b (positions closer to the light guide plate 16). The protruding members 21 protrude from the respective longer side portions of the panel pressing portion 13a toward the rear side along the Z axis direction, and are each formed in a substantially block shape that is horizontally long and that extends along the longer side direction (X axis direction). The protruding members 21 are respectively interposed between the side walls 13b of the frame 13 and the LED attachment portions 19a of the heat-dissipating members 19 of the LED units LU. In the Z axis direction, the protruding member 21 is interposed between the panel pressing portion 13a of the frame 13 and the chassis 14. The protruding member 21 has a groove 21a formed therein that opens toward the rear side and that is used for attaching a screw (fastening member) SM with which the frame 13, chassis 14, LED unit LU, and the like are affixed to each other. The groove 21a is formed over the substantially entire length of the protruding member 21 along the longitudinal direction (X axis direction).

As shown in FIG. 4, between one of the pair of protruding member 21 to which the heat-dissipating member 19 located in a position overlapping the flexible substrates 26 (left side of FIG. 4, lower side of FIG. 7) is attached, and the LED attachment portion 19a of the heat-dissipating member 19, a space with a prescribed width is formed, which is used as a substrate housing space BS that can house the printed board 27 therein. This means that the printed board 27 is interposed between the protruding member 21 and the LED attachment portion 19a. The printed board 27 is formed of a synthetic resin into a horizontally-long plate shape that extends along the lengthwise direction (X axis direction) of the protruding member 21 and the LED attachment portion 19a, and is housed in the substrate housing space BS such that the surface thereof is parallel to the outer surface (on the side opposite to the LED substrate 18) of the LED attachment portion 19a, or in other words, such that the longer side direction matches the X axis direction, the shorter side direction matches the Z axis direction, and the thickness direction matches the Y axis direction, respectively. On the printed board 27, a plurality of flexible substrates 26 are arranged at intervals along the longer side direction thereof, and the other ends of the flexible substrates 26 are respectively connected to the printed board 27. The flexible substrates 26 that are connected to the printed board 27 and the array substrate 11b of the liquid crystal panel 11 bridge over the LED attachment portion 19a, the LED substrate 18, and the LEDs 17 along the Y axis direction. The printed board 27 has a connector to which one end of an FPC is inserted for connection (neither connector nor FPC is shown), and the other end of the FPC is led out of the chassis 14 through an FPC thru-hole (not shown) formed in the chassis 14, and is connected to the control board CTB.

As shown in FIG. 4, in the respective longer side portions of the panel pressing portion 13a, light-shielding supporting members (light-shielding members, light guide plate supporting members) 23 are integrally formed in respective positions closer to the inner side (closer to the light guide plate 16) than the respective protruding members 21. The light-shielding supporting members 23 are each disposed between the liquid crystal panel 11 and the LEDs 17. The light-shielding supporting members 23 respectively protrude from the respective longer side portions of the panel pressing portion 13a toward the rear side, and are each formed in a substantially block shape that is horizontally long and that extends along the longer side direction (X axis direction). By blocking a space between the LEDs 17 and each end face of the liquid crystal panel 11 and optical members 15 that faces the LEDs 17, the light-shielding supporting member 23 prevents light from the LEDs 17 from directly entering each end face of the liquid crystal panel 11 and optical members 15 without passing through the light guide plate 16. That is, the light-shielding supporting member 23 has the so-called light-shielding function. The light-shielding supporting member 23 is configured such that the protrusion end face thereof makes contact with a portion of the light guide plate 16 that protrudes beyond the liquid crystal panel 11 and the optical members 15 toward the LEDs 17. Therefore, the light-shielding supporting member 23 can support the light guide plate 16 by sandwiching the light guide plate 16 with the chassis 14, which will be described below, and has the light guide plate supporting function. The light-shielding supporting member 23 makes contact with a portion of the light guide plate 16 at each edge (longer side edge) having the light-receiving surface 16b facing the LEDs 17. Therefore, by supporting the light guide plate 16 with the light-shielding supporting members 23, a stable positional relationship between the LEDs 17 and the light-receiving surfaces 16b can be maintained with respect to the Z axis direction. The light-shielding supporting members 23 are each formed so as to cover a longer side edge of the light guide plate 16 and a longer side edge of the bottom plate 14a of the chassis 14 in a plan view (when viewed from the display surface 11c) with respect to the Y axis direction (direction along which the LEDs 17 and the liquid crystal panel 11 are aligned), and in addition, so as to protrude from the light-receiving surface 16b of the light guide plate 16 toward the LEDs 17. On the surface of each light-shielding supporting member 23 facing the liquid crystal panel 11, a buffer member 23a is provided, and the buffer member 23a can receive the end face of the liquid crystal panel 11. In the assembly process, the buffer members 23a allow the liquid crystal panel 11 to be positioned with respect to the direction along the display surface 11a thereof. In one of the pair of light-shielding supporting members 23 that overlaps the flexible substrates 26 in a plan view, a plurality of flexible substrate passages 23b through which the flexible substrates 26 pass are formed at intervals along the X axis direction by cutting out corresponding portions thereof. The arrangement of the passages matches the arrangement of the respective flexible substrates 26.

As shown in FIGS. 4 and 8, in the inner edge of the panel pressing portion 13a, a pressing protrusion 24 protruding toward the rear side, or in other words, toward the liquid crystal panel 11 is formed integrally with the panel pressing portion 13a. The pressing protrusion 24 is formed along the entire circumference of the panel pressing portion 13a, and is formed in a horizontally-long quadrangular frame in a plan view. A buffer member 24a is attached to the protrusion end face of the pressing protrusion 24, and the pressing protrusion 24 can press the liquid crystal panel 11 via the buffer member 24a from the front side.

Figure 11:
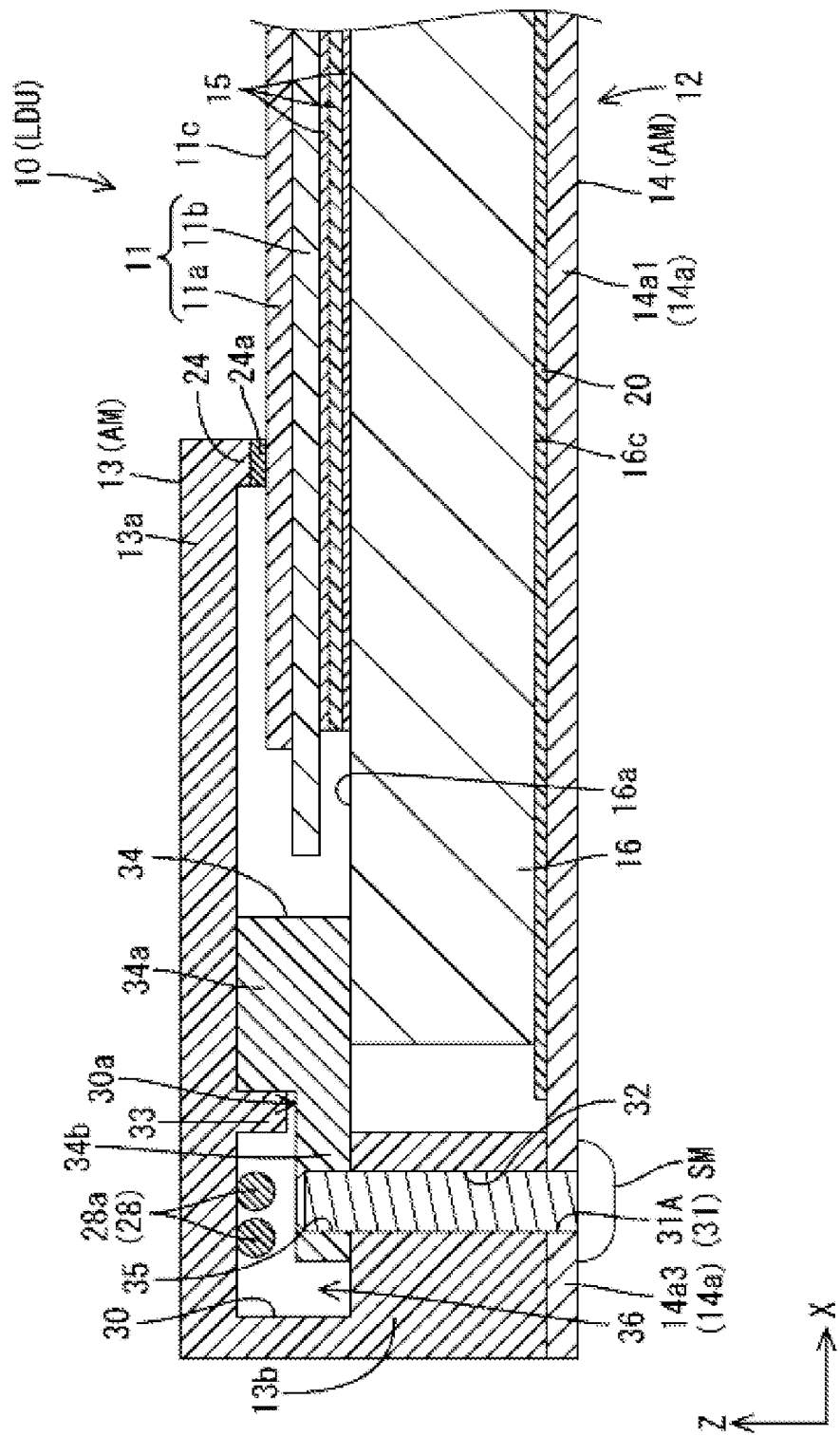
FIG. 11 is a cross-sectional view showing a cross-sectional configuration of the liquid crystal display device along the longer side direction, the figure illustrating a cutting portion of a thru-hole for a screw that jointly fastens a plurality of parts.

As shown in FIGS. 3 and 4, the chassis 14 is formed in a substantially shallow plate shape that is horizontally long as a whole so as to almost entirely cover the light guide plate 16, the LED units LU, and the like from the rear side. The rear outer surface of the chassis 14 (surface opposite to the side facing the light guide plate 16 and the LED units LU) is exposed to the outside on the rear side of the liquid crystal display device 10, and constitutes the rear surface of the liquid crystal display device 10. The chassis 14 is constituted of a bottom plate 14a formed in a horizontally-long quadrangular shape as in the light guide plate 16, and a pair of side walls 14b that rise from two longer side edges of the bottom plate 14a toward the front side. The bottom plate 14a is formed in a flat plate shape that has substantially the same size as the frame 13 in a plan view. The center portion in the shorter side direction thereof is a light guide plate receiving portion 14a1 that receives the entire light guide plate 16 (light guide reflective sheet 20) from the rear side, and the respective edge portions in the shorter side direction are LED unit receiving portions 14a2 that respectively receive the pairs of LED units LU. On the other hand, as shown in FIG. 11, while the center portion of the bottom plate 14a in the longer side direction thereof is the light guide plate receiving portion 14a1, the respective edge portions in the longer side direction are screw attachment portions (fastening member attachment portion) 14a3 in which the screws (fastening members) SM are disposed. The bottom plate 14a is formed in a flat plate shape as a whole without any step or the like in the middle thereof, and therefore, the light guide plate receiving portion 14a1, the LED unit receiving portions 14a2, and the screw attachment portions 14a3 of the bottom plate 14a are flush with each other. The outer edge portions of the bottom plate 14a of the chassis 14 are constituted of the LED unit receiving portions 14a2 and the screw attachment portions 14a3.

As shown in FIG. 4, the heat-dissipating portion 19b of the heat-dissipating member 19 constituting a part of the LED unit LU is attached to the LED unit receiving portion 14a2 so as to make surface-to-surface contact with the front surface thereof. Thru-holes 25 are formed in each LED unit receiving portion 14a2, and these thru-holes are where the screws SM are held to attach the heat-dissipating portion 19b and LED unit receiving portion 14a2 to the protruding member 21. The thru-holes 25 include a thru-hole 25A for jointly fastening a plurality of parts that is large enough to allow only the shaft portion of the screw SM to pass through as shown in FIG. 5, and a thru-hole 25B for the heat dissipating-member that is large enough to allow not only the shaft portion, but also the head of the screw SM to pass through as shown in FIG. 6. The screw SM going through the former fastens both of the heat-dissipating portion 19b and the LED unit receiving portion 14a2 to the protruding member 21, while the screw SM going through the latter fastens only the heat-dissipating portion 19b to the protruding member 21.

As shown in FIG. 11, a pair of shorter side portions of the side walls 13b of the frame 13 respectively abut on the pair of screw attachment portions 14a3, and the two components are affixed to each other by the screws SM disposed thereto. In the respective screw attachment portions 14a3 and respective shorter side portions of the side walls 13b, screw thru-holes 31 and 32 through which the screws SM pass are respectively formed.

Figure 9:
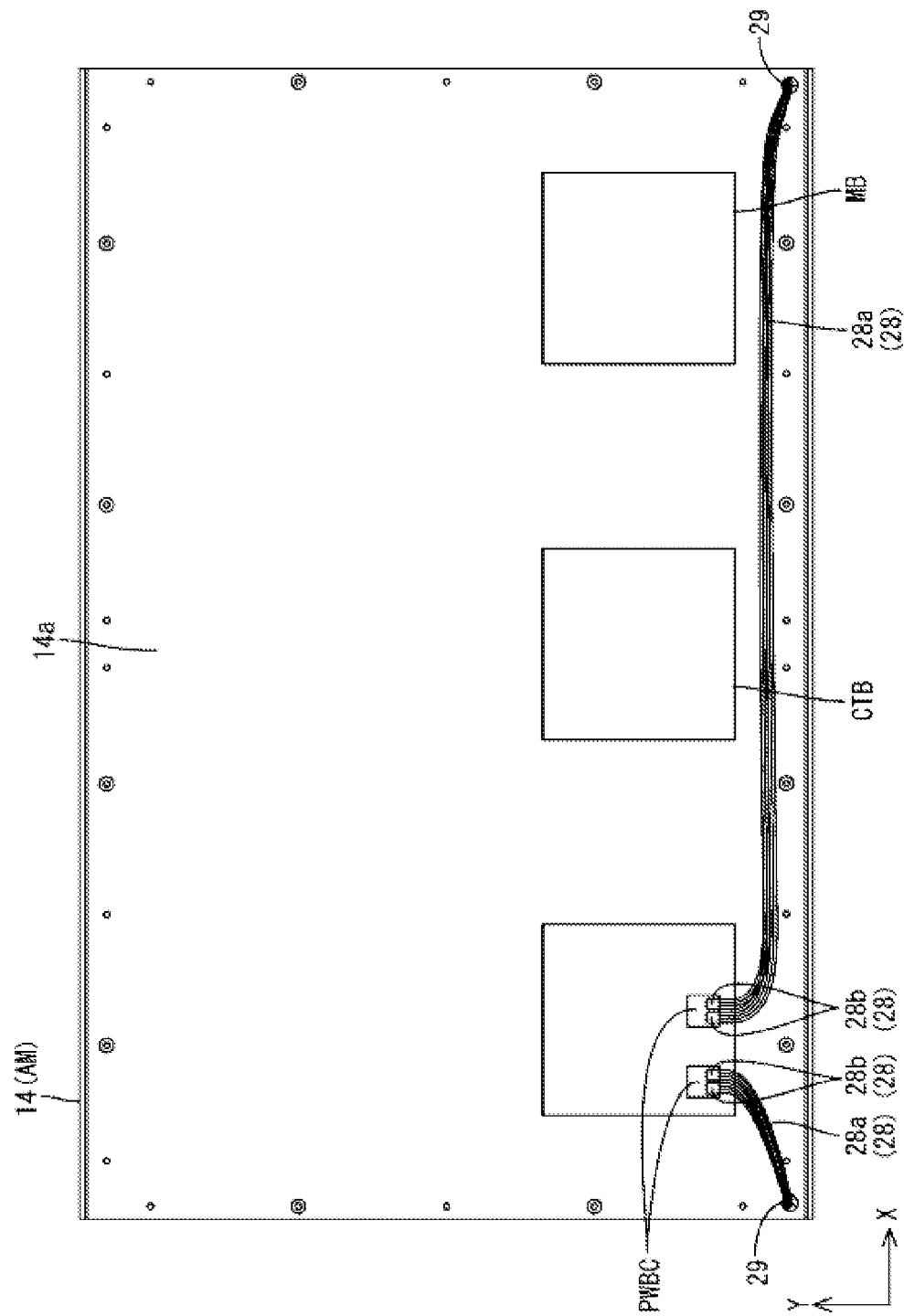
FIG. 9 is a rear view of the liquid crystal display device in which various boards are attached to the rear side of the chassis.

The wiring configuration of the LEDs 17 in the liquid crystal display device 10 of the present embodiment will be explained in detail. As shown in FIGS. 7 and 9, the LED substrates 18 on which the LEDs 17 are mounted and the power supply board PWB, which is the LED driver substrate, are electrically connected to each other by the wiring members 28, which makes it possible to supply power to the respective LEDs 17 (supply of driving power). Each wiring member 28 has a plurality of coated wires 28a that extend along the wiring path and a pair of wiring connectors 28b that is respectively provided at two ends of the coated wire bundle constituted of the plurality of coated wires 28a, and one of the pair of the wiring connectors 28b is inserted and connected into the substrate connector 22 of the LED substrate 18, and the other wiring connector 28b is inserted and connected into the board connector PWBC of the power supply board PWB, respectively. The wiring members 28 are provided for respective LED substrates 18, and the number of the wiring members 28 is the same as the number of LED substrates 18. In the present embodiment, a total of four is used. While the LED substrates 18 are disposed inside of the frame 13 and the chassis 14, the power supply board PWB that is connected to the LED substrates 18 via the wiring members 28 is disposed outside of the frame 13 and the chassis 14 (on the outer surface of the chassis 14). Therefore, in the chassis 14, wiring thru-holes 29 through which the wiring members 28 are led out of the chassis 14 are formed.

As shown in FIGS. 2 and 9, because the chassis 14 is also the exterior member AM constituting a part of the exterior of the liquid crystal display device 10, the wiring thru-holes 29 are disposed in an area that is covered by the cover member CV such that the wiring members 28, which are led out to the rear side of the chassis 14, are not visible externally. Specifically, as shown in FIG. 9, the pair of wiring thru-holes 29 is disposed in positions closer to one end (lower side of FIGS. 7 and 9) in the shorter side direction of the bottom plate 14a of the chassis 14, and are formed near two corners (two ends in the longer side direction), respectively. In the liquid crystal display device 10 of the present embodiment, two pairs of LED units LU are provided at the respective sides across the light guide plate 16 in the shorter side direction, and one pair is located closer to the cover member CV and the wiring thru-holes 29 (lower side of FIGS. 7 and 9), and the other pair is located closer to the side opposite to the cover member CV and the wiring thru-holes 29 (upper side of FIGS. 7 and 9). Thus, it is necessary to bring the wiring members 28 connected to the LED substrates 18 of the latter to the wiring thru-holes 29 inside of the frame 13 and the chassis 14.

In securing the wiring paths for the wiring members 28 in the frame 13 and the chassis 14, if the wiring paths are formed under the light guide plate 16, for example, it is necessary to configure the bottom plate 14a of the chassis 14 such that portions thereof protrude toward the rear side, which makes the shape of the chassis 14 complex, causing the manufacturing cost to be higher, and the liquid crystal display device 10 cannot be made thinner. Therefore, in order to simplify the shape of the chassis 14, reduce the thickness of the liquid crystal display device 10, and the like, it is preferable to provide the wiring paths for the wiring members 28 in the outer edge portions of the frame 13 and the chassis 14 that are located outside of the light guide plate 16. However, the screws SM are disposed at the outer edge portions of the frame 13 and the chassis 14 to fasten the two components to each other, and if the wiring paths are formed next to the screws SM at the inner side or the outer side thereof, the width of the outer edge portions of the frame 13 and the chassis 14 would be greater, which prevents the frame portion of the liquid crystal display device 10 from being made narrower.

Figure 10:
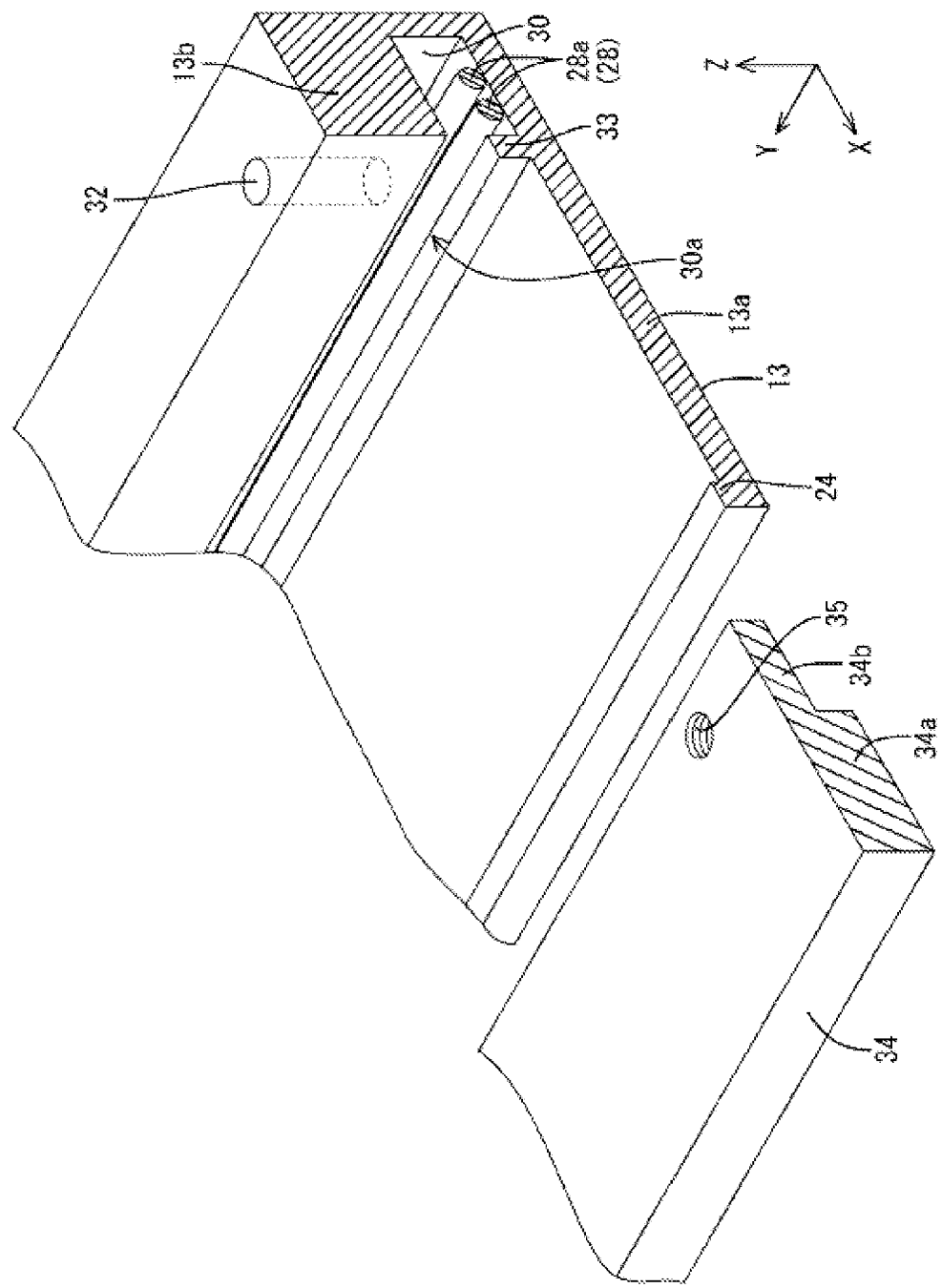
FIG. 10 is a perspective view of a main part of a frame and reinforcement member in the liquid crystal display device, a part of which is cut out.

In the present embodiment, however, as shown in FIGS. 8, 10, and 11, each wiring passage 30 through which the wiring member 28 passes is formed in the inner surface of the outer edge portion of the frame 13, and the wiring passage 30 is disposed adjacent to the screw SM along the Z axis direction, that is, the direction along which the light guide plate 16 and the liquid crystal panel 11 are stacked. In other words, the wiring passages 30 and the wiring members 28 passing therethrough respectively correspond in position to the screws SM in a plan view (when viewed from the display surface 11c). With this configuration, it is possible to accommodate the wiring members 28 in the liquid crystal display device 10 while achieving a narrower frame and thickness reduction of the liquid crystal display device 10, and making the shape of the chassis 14 simple.

Specifically, as shown in FIGS. 8 and 10, the wiring passages 30 are respectively formed in the inner surfaces of the pair of shorter side portions of the side walls 13b of the frame 13. The wiring passages 30 open toward the inner side (toward the light guide plate 16 and LEDs 17), and the wiring members 28 can be freely placed in and out through the openings 30a. The wiring passages 30 each extend over the substantially entire length of the shorter side portion of the side walls 13b, and have an opening over the entire length thereof. As a result, in the process of installing the wiring member 28 in the wiring passage 30, the wiring member 28 can be placed in the wiring passage 30 from the side of the wiring passage 30, which makes the process easier. As shown in FIG. 7, in the side walls 13b, wiring thru-holes 37 through which the wiring members 28 pass are formed in positions that correspond to the wiring thru-holes 29 of the chassis 14. The wiring thru-holes 37 open in the wiring passages 30, respectively, and continue to the respective wiring thru-holes 29 of the chassis 14. The pair of wiring thru-holes 37 are positioned closer to one side of the side walls 13b in the shorter side direction (lower side of FIGS. 7 and 9), and are formed near two corners (respective ends of the longer side direction), respectively.

As shown in FIGS. 10 and 11, the wiring passage 30 is disposed in a position that corresponds to the liquid crystal panel 11 in the Z axis direction (aligned with the liquid crystal panel 11 in the X axis direction), and is located closer to the front side than the LEDs 17 and the light guide plate 16. That is, the wiring passage 30 opens toward the LEDs 17 and the light guide plate 16 disposed closer to the rear side in the Z axis direction. The wiring passage 30 is formed in a protrusion base portion of the side wall 13b in the Z axis direction, and by cutting out an inner portion of the protrusion base portion while leaving the outer edge portion thereof, the cross-section thereof is formed in a substantially rectangular shape. In the wiring passage 30, an opening 30a is formed by opening a portion of an inner edge of the protrusion base portion of the side wall 13b (cutting out an end portion of the inner edge while leaving the base portion thereof), and the height of the opening 30a (dimension thereof in the Z axis direction) is smaller than the height of the wiring passage 30, thereby having a narrow clearance. That is, the opening edge of the opening 30a of the wiring passage 30 includes a protrusion 33 protruding from the panel pressing portion 13a, and the protrusion 33 is disposed between the liquid crystal panel 11 and the wiring member 28.

As shown in FIG. 11, the protrusion end portion of the side wall 13b where the wiring passage 30 is not formed is configured such that the end face thereof abuts on the screw attachment portion 14a3 of the bottom plate 14a of the chassis 14, and has a screw thru-hole 32 through which the screw SM pass. The screw SM is inserted and screwed into the screw thru-hole 31 of the screw attachment portion 14a3 and the screw thru-hole 32 of the side wall 13b, and therefore, the screw SM is aligned with the wiring member 28 that runs inside of the wiring passage 30 along the Z axis direction, or in other words, the direction along which the liquid crystal panel 11 and the light guide plate 16 are stacked.

When the wiring passages 30 are formed in the frame 13, it is possible that the mechanical strength of the frame 13 is reduced. In particular, because the wiring passages 30 are formed in the protrusion base portions of the side walls 13b that protrude from the panel pressing portion 13a of the frame 13, the frame 13 is more susceptible to the strength reduction. In order to address the issue, as shown in FIGS. 10 and 11, the frame 13 of the present embodiment is provided with a reinforcement member 34 attached thereto so as to close the opening 30a of the wiring passage 30. The reinforcement member 34 is made of a metal material (such as aluminum or iron), and is formed in a substantially square flat rod that extends along the Y axis direction, or the lengthwise direction of the wiring passage 30. As shown in FIG. 8, the length dimension of the reinforcement member 34 is substantially the same as the shorter side dimension of the light guide plate 16, and is disposed across the pair of LED substrates 18 disposed at the respective sides of the light guide plate 16. That is, the reinforcement member 34 extends over almost the entire length of the routing path of the wiring member 28 connected to the LED substrate 18.

As shown in FIGS. 10 and 11, the reinforcement member 34 is constituted of a first portion (light guide plate supporting portion, holding member supporting portion) 34a that is disposed outside of the wiring passage 30, and a second portion (fastening member locking portion) 34b that protrudes from the first portion 34a toward the inside of the wiring passage 30, and closes the opening 30a of the wiring passage 30 as a whole. The reinforcement member 34 is attached to the wiring passage 30 of the frame 13 along the X axis direction (opening direction of the wiring passage 30), and the second portion 34b is thereby placed into the wiring passage 30.

As shown in FIGS. 10 and 11, the Z axis dimension of the first portion 34a is larger than the protrusion 33 that constitutes the opening edge of the wiring passage 30. The first portion 34a abuts on the inner surface of the panel pressing portion 13a and on the side face of the protrusion 33 on the side opposite to the wiring member 28. That is, the first portion 34a constitutes the frame supporting portion (holding member supporting portion) that supports the frame 13. The first portion 34a extends so as to overlap the light guide plate 16 in a plan view, and the overlapping portion thereof abuts on the front surface of the light guide plate 16, or in other words, the light-emitting surface 16a (surface facing the liquid crystal panel 11), and constitutes the light guide plate supporting portion. The first portion 34a abuts on the shorter side edge of the light guide plate 16 over substantially the entire length thereof. The first portion 34a can support the light guide plate 16 together with the light-shielding supporting portions 23 by sandwiching the light guide plate 16 with the chassis 14. This way, almost the entire outer edges of the light guide plate 16 are supported by the first portions 34a and the light-shielding supporting portions 23 from the front side. The Z axis dimension of the first portion 34a is substantially the same as the distance between the panel pressing portion 13a and the light guide plate 16. With this configuration, the first portion 34a is interposed between the panel pressing portion 13a and the light guide plate 16, and abuts on the respective surfaces of the two components, and therefore, the first portion 34a can not only firmly support the panel pressing portion 13a and the light guide plate 16, but also reinforce the frame 13.

As shown in FIGS. 10 and 11, the Z axis dimension of the second portion 34b is smaller than that of the first portion 34a, and is substantially the same as the dimension of the opening 30a of the wiring passage 30. The second portion 34b protrudes from the side face of the first portion 34a, and enters the wiring passage 30 through the opening 30a, thereby corresponding in position to the screw SM and the wiring member 28 in a plan view. In a part of the second portion 34b that corresponds in position to the screw SM, a screw hole (fastening member locking hole) 35 that holds the screw SM so as not to come off is formed. The screw hole 35 is threaded so as to engage the screw thread of the shaft of the screw SM. On the other hand, the second portion 34b makes surface-to-surface contact with a surface inside of the wiring passage 30, the surface being closer to the rear side (closer to the screw SM). Therefore, when the screw SM is tightened into the screw hole 35 of the second portion 34b, at least the side wall 13b of the frame 13 is held between the second portion 34b and the head of the screw SM. Between the protruding end face of the second portion 34b that protrudes from the first portion 34a and the inner surface of the wiring passage 30 that faces the protruding end face, a space larger than the diameter of the wiring members 28 is formed, and this space is a relief space 36 for the wiring member 28. By securing the relief space 36, when attaching the reinforcement member 34 to the wiring passage 30, the wiring member 28 can be prevented from being pinched between the protruding end face of the second portion 34b and the inner surface of the wiring passage 30.

Figure 12:
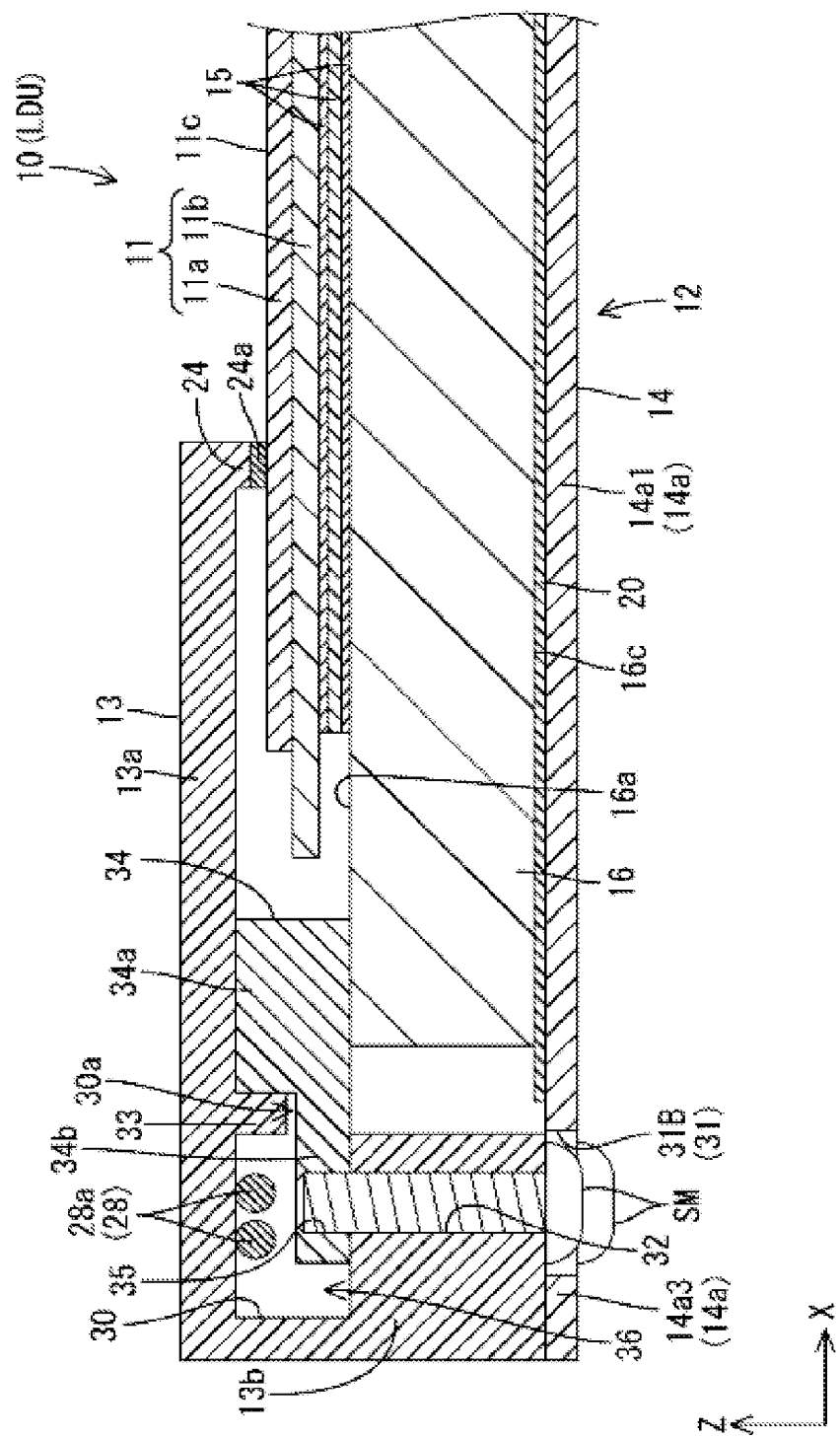
FIG. 12 is a cross-sectional view showing a cross-sectional configuration of the liquid crystal display device along the longer side direction, the figure illustrating a cutting portion of a thru-hole for a reinforcement member.

In the screw attachment portion 14a3, the following two types of holes are formed as the screw thru-holes 31 for the screws SM that are inserted into the screw holes 35 of the second portions 34b of the respective reinforcement members 34. That is, the screw thru-holes 31 include a screw thru-hole 31A for jointly fastening a plurality of parts that is large enough to allow only the shaft portion of the screw SM to pass through as shown in FIG. 11, and a screw thru-hole 31B for the reinforcement member that is large enough to allow not only the shaft portion, but also the head of the screw SM to pass through as shown in FIG. 12. The screw SM going through the former jointly fastens the reinforcement member 34, side wall 13b, and screw attachment portion 14a3 to each other, while the screw SM going through the latter fastens the reinforcement member 34 and the side wall 13b.

The present embodiment has the above-mentioned structure, and the operation thereof will be explained next. The liquid crystal display device 10 is manufactured by assembling respective constituting components that are manufactured separately (frame 13, chassis 14, liquid crystal panel 11, optical members 15, light guide plate 16, LED units LU, wiring members 28, reinforcement members 34, and the like) together. In the assembly process, the respective constituting components are assembled after being flipped over with respect to the Z axis direction from the position shown in FIGS. 5 and 11. First, as shown in FIGS. 13 and 14, the frame 13 among the constituting components is set on a not-shown work table such that the rear side thereof faces up in the vertical direction.

On the frame 13 that has been set with the orientation described above, as shown in FIGS. 13 and 14, the liquid crystal panel 11 is placed with the CF substrate 11a facing down and the array substrate 11b facing up in the vertical direction. The front surface of the liquid crystal panel 11 is received by the buffer member 24a attached to the pressing protrusion 24 of the frame 13, and the end faces thereof are received by the buffer members 23a attached to the light-shielding supporting portions 23 of the frame 13, thereby absorbing shock and accurately positioning the liquid crystal panel 11 with respect to the X axis direction and the Y axis direction. Next, the respective optical members 15 are directly stacked on the rear side of the liquid crystal panel 11 in an appropriate order.

Figure 13:
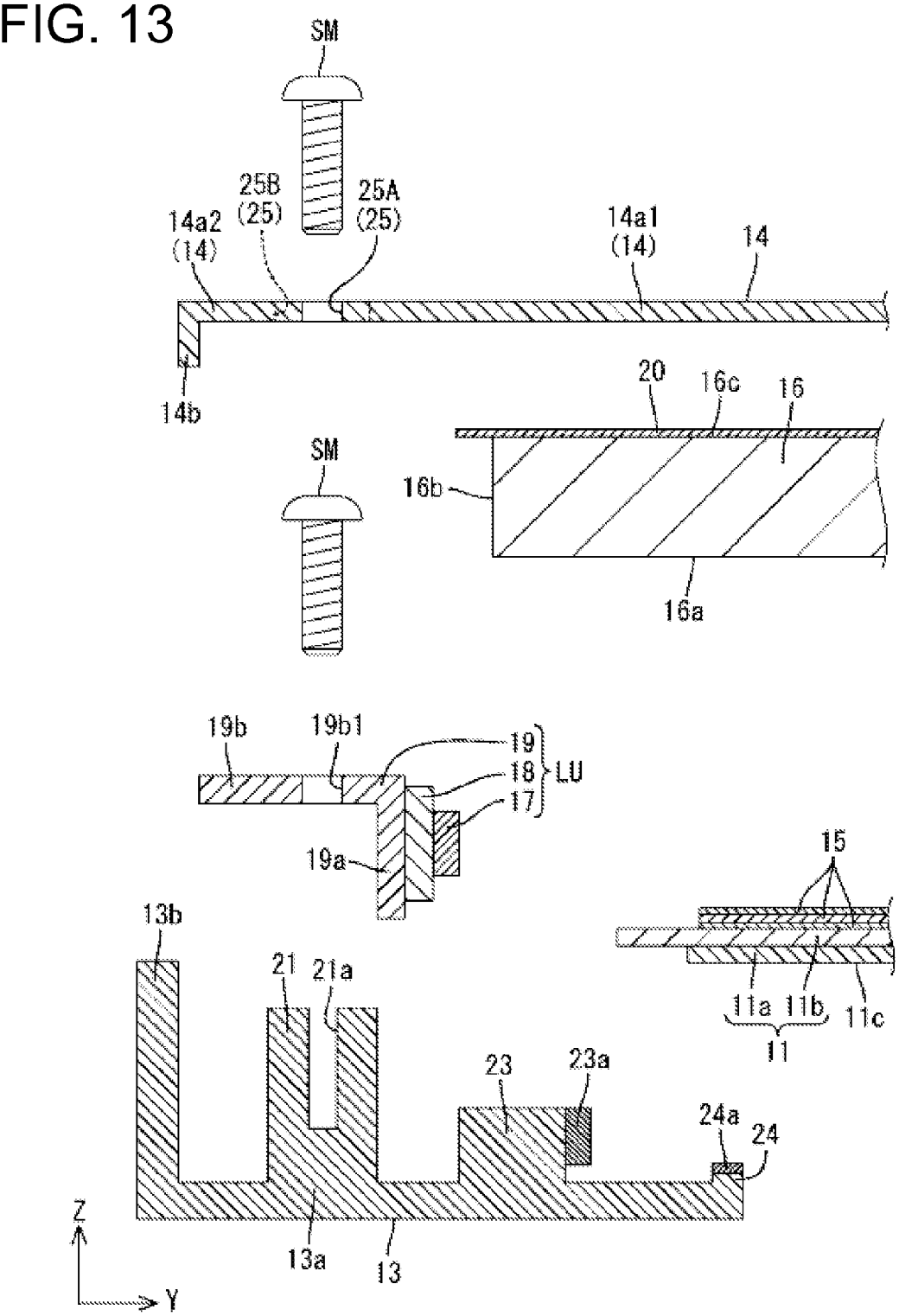
FIG. 13 is a cross-sectional view showing a cross-sectional configuration of the liquid crystal display device along the shorter side direction, the figure illustrating assembly steps for respective constituting components of a liquid crystal display unit in the liquid crystal display device.
Figure 14:
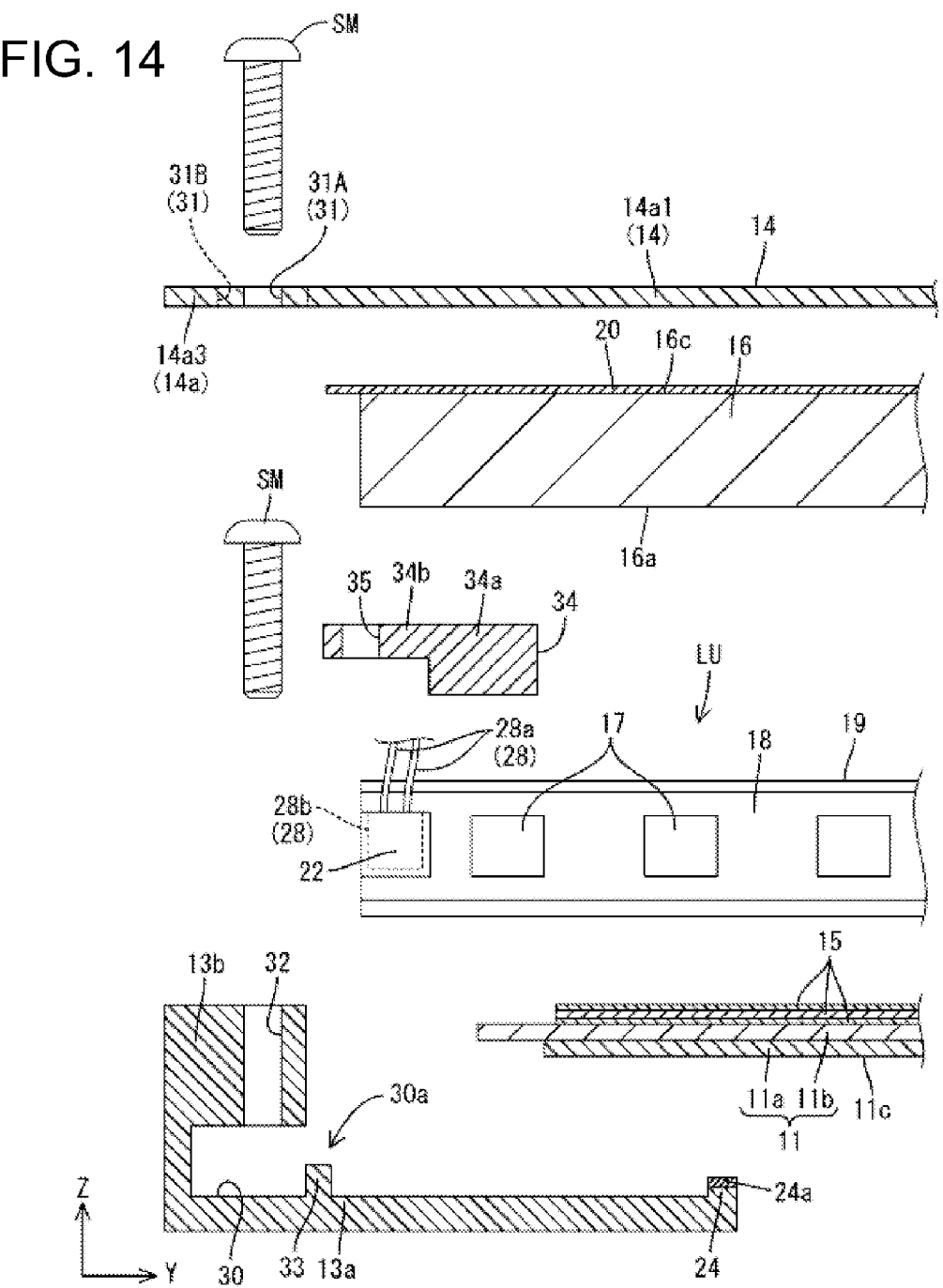
FIG. 14 is a cross-sectional view showing a cross-sectional configuration of the liquid crystal display device along the longer side direction, the figure illustrating assembly steps for respective constituting components of a liquid crystal display unit in the liquid crystal display device.

On the other hand, as shown in FIGS. 13 and 14, the LED units LU each having the LEDs 17, the LED substrate 18, and the heat-dissipating member 19 assembled together, and the wiring members 28 are attached to the frame 13. To explain the assembly process for the LED units LU first, as shown in FIG. 13, the LED units LU are each attached to the protruding member 21 of the frame 13 such that the LEDs 17 are oriented toward the center (inner side) of the frame 13, and such that the heat dissipating-portion 19b of the heat-dissipating member 19 faces the protruding member 21. When the LED units are attached, the LED attachment portions 19a and the heat-dissipating portions 19b of the respective heat-dissipating members 19 respectively make surface-to-surface contact with the protruding members 21. Also, in this state, the LED units LU are positioned such that respective thru-holes 19b1 of the heat-dissipating portions 19b are connected to the grooves 21a of the protruding members 21, respectively.

Next, the screws SM are inserted through the corresponding thru-holes 19b1 in the heat-dissipating portions 19b, and screwed into the grooves 21a of the protruding members 21, respectively. With the screws SM, the LED units LU are affixed to the protruding members 21 in the stage before the chassis 14 is attached in a manner described below (see FIG. 7). The timing at which the LED units LU are attached to the frame 13 may be appropriately modified, and the LED units LU may be attached before the optical members 15 are attached or the liquid crystal panel 11 is attached.

On the other hand, as shown in FIG. 14, of the wiring member 28 having the wiring connectors 28b disposed at the two ends of the coated wires 28a, the coated wires 28a are housed in the wiring passage 30 via the opening 30a, one of the wiring connectors 28b is led out from the opening 30a toward the LED substrate 18, and the other wiring connector 28b is passed through the wiring thru-hole 37. Among the wiring members 28 for the respective LED substrates 18, the wiring members 28 connected to the LED substrates 18 that are located at the side opposite to the wiring thru-holes 37 (wiring thru-hole 29) need to run across the space inside of the frame 13 along the Y axis direction toward the wiring thru-holes 37 as shown in FIG. 8. Because the wiring passages 30 of the present embodiment each extend along the wiring path and each open toward the inner side over the entire length thereof, the coated wires 28a of the wiring members 28 described above can be placed in the wiring passages 30 at once from the X axis direction (direction intersecting with the wiring path). Therefore, the wiring installation process is made easier. Of the wiring member 28, the wiring connector 28b that was led out from the wiring passage 30 toward the LED substrate 18 is inserted and connected into the substrate connector 22 of the LED substrate 18. The wiring member 28 connected to the LED substrate 18 located on the side opposite to the wiring thru-hole 37 and the wiring member 28 connected to the LED substrate 18 located on the same side as the wiring thru-hole 37 collectively pass through one wiring thru-hole 37. The installation process of the wiring members 28 described above can be conducted before the LED units LU are attached.

After installing the LED units LU and the wiring members 28 in the manner described above, the installation process of the reinforcement members 34 is conducted. As shown in FIG. 14, the reinforcement member 34 is disposed inside of the shorter side portion of the side walls 13b of the frame 13, and is attached to the frame 13 by inserting the second portion 34b into the wiring passage 30 along the X axis direction while making the first portion 34a be in contact with the inner surface of the panel pressing portion 13a. Because the wiring member 28 is already in the wiring passage 30, there is a concern that the coated wires 28a of the wiring member 28 are pinched between the protruding end face of the second portion 34b of the reinforcement member 34 and the inner surface of the wiring passage 30. However, in the present embodiment, the relief space 36 larger than the diameter of the coated wires 28a of the wiring member 28 is secured between the protruding end face of the second portion 34b and the inner surface of the wiring passage 30, and therefore, it is possible to prevent the coated wires 28a from being pinched. When the side face of the first portion 34a of the reinforcement member 34 touches the protrusion 33 constituting the opening edge of the wiring passage 30, the screw hole 35 of the second portion 34b is connected to the screw thru-hole 32 of the side wall 13b. That is, the position of the reinforcement member 34 is determined by the protrusion 33. Next, the screw SM is passed through the corresponding screw thru-hole 32 in the side wall 13b, and is screwed into the screw hole 35 of the reinforcement member 34 that continued from the screw thru-hole 32 on the back side. In this way, the reinforcement member 34 and the frame 13 are fastened to each other by the screw SM in the stage before the chassis 14 is attached in the manner described below (see FIG. 12).

Thereafter, as shown in FIGS. 13 and 14, the light guide plate 16 having the reflective sheet 20 attached thereto in advance is directly stacked on the rear surface of the rearmost member of the optical members 15. The respective longer side edges of the light guide plate 16 are supported by the light-shielding supporting portions 23 of the frame 13, and the respective shorter side edges of the light guide plate 16 are supported by the first portions 34*a* of the reinforcement members 34.

After installing the liquid crystal panel 11, optical members 15, light guide plate 16, LED units LU, wiring members 28, and reinforcement members 34 to the frame 13 as described above, a process to install the chassis 14 is conducted. As shown in FIGS. 13 and 14, the chassis 14 is attached to the frame 13 with the front side thereof facing down in the vertical direction. It is preferable to pass the other wiring connector 28*b* of the wiring member 28 through the wiring thru-hole 29 of the chassis 14 before this process. By having the respective side walls 14*b* of the chassis 14 make contact with the inner surfaces of the side walls 13 on the respective longer sides of the frame 13, the chassis 14 can be positioned to the frame 13. In the assembly process, the heads of the screws SM that have been attached to the heat-dissipating members 19 and the protruding members 21 in advance are passed through the respective screw thru-holes 25B for heat-dissipating members in the respective LED unit receiving portions 14*a*2 in the bottom plate 14*a* of the chassis 14 (see FIG. 7), and the heads of the screws SM that have been attached to the side walls 13*b* and the reinforcement members 34 in advance are passed through the screw thru-holes 31B for reinforcement members in the respective screw attachment portions 14*a*3 of the bottom plate 14*a* (see FIG. 12). Then, when the light guide place receiving portion 14*a*1 of the bottom plate 14*a* of the chassis 14 makes contact with the light guide plate 16 (light guide reflective sheet 20) and the respective LED unit receiving portions 14*a*2 make contact with the heat-dissipating portions 19*b* of the respective heat-dissipating members 19, screws SM are inserted through the thru-holes 25A for jointly fastening a plurality of parts, and screwed into the grooves 21*a* of the protruding members 21. At the same time, screws SM are inserted through the thru-holes 31A for jointly fastening a plurality of parts, and screwed into the screw holes 35 of the reinforcement members 34. With the screws SM, the LED units LU, the chassis 14, and the frame 13 are affixed to each other (see FIG. 6), and the reinforcement members 34, the chassis 14, and the frame 13 are affixed to each other (FIG. 11).

The assembly of the liquid crystal display unit LDU is completed in the manner described above. Next, the stand attachment members STA and various boards PWB, MB, and CTB are attached to the rear side of the liquid crystal display unit LDU. The other wiring connectors 28*b* of the respective wiring members 28 that were led out through the wiring thru-holes 29 of the chassis 14 are inserted and connected into the board connector PWBC of the power supply board PWB. With this configuration, the driving power from the power supply board PWB disposed outside of the chassis 14 can be supplied to the respective LEDs 17 on the LED substrates 18 through the wiring members 28. Thereafter, by attaching the stand ST and the cover member CV, the liquid crystal display device 10 and the television receiver TV are manufactured. The cover member CV covers the various boards PWB, MB and CTB, and the wiring members 28 led out from the wiring thru-holes 29, and these components are not externally visible. In the liquid crystal display device 10 manufactured in this manner, the exterior thereof is constituted of the frame 13 that presses the liquid crystal panel 11 from the display surface 11*c* side, and the chassis 14 of the backlight device 12, and the liquid crystal panel 11 is directly stacked on the optical members 15. Therefore, as compared with a conventional configuration in which a cabinet made of a synthetic resin is provided in addition to the frame 13 and the chassis 14, or in which a member is provided between the liquid crystal panel 11 and the optical members 15 so as to keep the two from making contact with each other, the number of parts and the assembly man-hour can be reduced, resulting in a lower manufacturing cost, and the size and weight reduction.

When the liquid crystal display device 10 manufactured as described above is turned on, as shown in FIG. 4, power is supplied from the power supply board PWB, causing various signals to be sent from the control board CTB to the liquid crystal panel 11, and the drive of the liquid crystal panel 11 is controlled and the respective LEDs 17 of the backlight device 12 are driven. By passing through the optical members 15 after being guided by the light guide plate 16, light from the respective LEDs 17 is converted to even planar light, which then illuminates the liquid crystal panel 11, and a prescribed image is displayed on the liquid crystal panel 11. To explain the operation of the backlight device 12 in detail, when the respective LEDs 17 are lit, light emitted from the respective LEDs 17 enters the light-receiving surfaces 16*b* of the light guide plate 16 that face the LEDs 17 as shown in FIG. 5. In the process of travelling through the light guide plate 16 while being subject to the total reflection at the interfaces between the light guide plate 16 and external air spaces, being reflected by the light guide reflective sheet 20, and the like, the light that entered the light-receiving faces 16*b* is reflected or diffused by not-shown reflective portions and diffusion portions, thereby being outputted from the light-emitting surface 16*a* and being radiated to the optical members 15.

As described above, the liquid crystal display device (display device) 10 of the present embodiment includes: the LEDs (light sources) 17; the liquid crystal panel (display panel) 11 that conducts display using light from the LEDs 17; the light guide plate 16 laid on a side of the display panel 11 opposite to a display surface 11*c* side thereof, the light guide plate being disposed such that an end face thereof faces the LEDs 17; the exterior member AM constituted of the frame 13 and the chassis 14 that are a pair of holding members that hold the display panel 11 and the light guide plate 16 by sandwiching the display panel 11 and the light guide plate 16 from the display surface 11*c* side and the side opposite thereto, the frame 13 and the chassis 14, which is the pair of holding members, having the LEDs 17 housed therebetween, the exterior member AM constituting the exterior of the liquid crystal display device 10; the screws (fastening member) SM that are disposed to an outer edge portion of the frame 13 and the chassis 14, which are the pair of holding members, the outer edge portion surrounding the display panel 11, thereby fastening the frame 13 and the chassis 14, which are the pair of holding members, to each other; and the wiring members 28 connected to the LEDs 17, wherein the display device has wiring passages 30 formed in the inner surface of the outer edge portion of the frame 13 among the pair of the holding members, which are the frame 13 and the chassis 14, the wiring passages 30 providing for passages of the wiring members 28, the wiring passages 30 being adjacent to the screws SM in a direction along which the light guide plate 16 and the display panel 11 are stacked.

As described above, the frame 13 and the chassis 14, which are the pair of holding members that sandwich the display panel 11 and the light guide plate 16 from the display surface 11c side and the side opposite thereto and that house the LEDs 17 therebetween, constitute the exterior member AM constituting the exterior of the liquid crystal display device 10, and the wiring passages 30 providing for passages of the wiring members 28 connected to the LEDs 17 are formed in the inner surface of the frame 13 among the pair of holding members, which are the frame 13 and the chassis 14. Therefore, it is possible to accommodate the wiring members 28 inside of the liquid crystal display device 10, and the exterior of the liquid crystal display device 10 can be made simple. On the other hand, the frame 13 and the chassis 14, which are the pair of holding members, are fastened to each other by the screws SM that are disposed in the outer edge portion of the frame 13 and the chassis 14, which is the pair of holding members, the outer edge portion surrounding the display panel 11.

Because the wiring passages 30 are formed in the inner surfaces of the side walls 13b, which is the outer edge portion of the frame 13 among the pair of holding members, i.e., the frame 13 and the chassis 14, so as to be adjacent to the screws SM in a direction along which the light guide plate 16 and the liquid crystal panel 11 are stacked, the wiring members 28 that pass through the wiring passages 30 are also adjacent to the screws SM in the direction along which the light guide plate 16 and the liquid crystal panel 11 are stacked. By having such a positional relationship, it is possible to reduce the width of the outer edge portion as compared with the configuration in which the wiring members are arranged adjacent to the screws SM at the outer side or inner side thereof, for example. This makes this configuration preferable in achieving a narrower frame in the liquid crystal display device 10. Furthermore, by having such a positional relationship, the screws SM and the wiring members 28 are disposed using a space created by the light guide plate 16 and the liquid crystal panel 11 stacked together in the thickness direction thereof, which makes it possible to keep the liquid crystal display device 10 thin. With the present embodiment, it is possible to accommodate the wiring members 28 in the liquid crystal display device 10 while achieving the narrower frame.

In the frame 13, which is the holding member having the wiring passages 30 formed therein, the reinforcement members 34 are respectively attached so as to close the openings 30a of the wiring passages 30. When the wiring passages 30 are formed in the frame 13, which is the holding member, the strength of the frame 13, which is the holding member, is possibly lowered, but by providing the reinforcement members 34 in the frame 13, which is the holding member, so as to close the openings 30a of the wiring passages 30, respectively, it is possible to make up for the strength reduction of the frame 13, which is the holding member. The reinforcement members 34 that close the openings 30a of the wiring passages 30 can also prevent the wiring members 28 that pass through the wiring passages 30 from sticking out of the wiring passages 30.

The wiring passages 30 are each formed so as to extend along the wiring path of the wiring member 28 and so as to have an opening along the entire extension direction of the wiring path, and the reinforcement members 34 are formed so as to extend along the wiring passages 30. With this configuration, because the wiring passages 30 are each formed to have an opening along the entire extension direction thereof in the inner surface of the outer edge portion of the frame 13, which is the holding member, the wiring members 28 can be placed in the wiring passages 30 with ease in the process of installing the wiring members 28, which makes this process easier. When the wiring passages 30 are formed in the above-mentioned manner, the strength of the frame 13, which is the holding member, would be reduced more, but because the reinforcement members 34 are provided so as to extend along the wiring passages 30, the reduction in strength of the frame 13, which is the holding member, can be sufficiently made up for. Furthermore, the reinforcement members 34 disposed so as to extend along the wiring passages 30 can prevent the wiring members 28 from sticking out from the wiring passages 30 more reliably.

The screws SM are disposed in the outer edge portions of the frame 13 and the chassis 14, which are the pair of holding members, so as to penetrate therethrough, and the reinforcement members 34 each have the second portion (fastening member locking portion) 34b that locks the inserted screws SM. In this configuration, the screws SM disposed in the outer edge portions of the frame 13 and the chassis 14, which are the pair of holding members, so as to penetrate therethrough is locked by the second portion 34b, and therefore, the frame 13 and the chassis 14, which are the pair of holding members, and the reinforcement member 34 can be fastened to each other. The frame 13, which is the holding member having the wiring passages 30 formed therein, has a more complex shape than the reinforcement member 34 because of the wiring passages 30. By providing the second portion 34b in the reinforcement member 34 instead of the frame 13, which is the holding member having such a complex shape, the manufacturing of the frame 13, which is the holding member, can be made easy, which makes this configuration preferable in reducing the manufacturing cost.

The second portion 34b is disposed so as to protrude into the wiring passage 30 along the direction in which the reinforcement member 34 is attached to the frame 13, which is the holding member having the wiring passage 30 formed therein, and the second portion 34b is formed such that a relief space 36 for having the wiring member 28 therein is provided between a protruding end face thereof and the inner surface of the wiring passage 30. In this configuration, it is possible to prevent the wiring member 28 from being pinched between the reinforcement member 34 and the frame 13, which is the holding member, when the reinforcement member 34 is attached to the frame 13 after the wiring member 28 is placed in the wiring passage 30, because the relief space 36 is secured between the inner surface of the wiring passage 30 and the protruding end face of the second portion 34b that protrudes into the wiring passage 30 along the attachment direction. As a result, it is possible to prevent the wiring members 28 from being damaged and the like in the manufacturing process.

The reinforcement member 34 has the first portion (light guide plate supporting portion) 34a that is disposed so as to overlap the light guide plate 16 when viewed from the display surface 11c side, the first portion 34a abutting on a surface of the light guide plate 16 facing the liquid crystal panel 11. With this configuration, by the first portion 34a of the reinforcement member 34 abutting on the light guide plate 16, the light guide plate 16 can be supported by being sandwiched between the first portion 34a and the chassis 14, which is the holding member disposed on a side opposite to the display surface 11c side. This makes it possible to position the light guide plate 16 with respect to the LEDs 17.

The reinforcement member 34 has the first portion (holding member supporting portion) 34a that is disposed so as to overlap the light guide plate supporting portion when viewed from the display surface 11c side, the first portion 34a abutting on a surface of the frame 13 facing the light guide plate 16, the frame 13 being the holding member disposed on the display surface 11c side among the pair of holding members that are the frame 13 and the chassis 14. With this configuration, by the first portion 34a, the light guide plate 16 can be supported more firmly, and the frame 13, which is the holding member disposed on the display surface 11c side, can also be supported and reinforced.

Of the frame 13 and the chassis 14, which is the pair of the holding members, the frame 13, which is the holding member disposed on the display surface 11c side, has the panel pressing portion 13a that is parallel to the display surface 11c of the liquid crystal panel 11 and that presses the liquid crystal panel 11, and the side walls 13b that protrude from the outer edges of the panel pressing portion 13a toward a side opposite to the display surface 11c side and that abut on the chassis 14, which is the holding member disposed on the side opposite to the display surface 11c side. The wiring passages 30 are formed in the protruding base portions of the side walls 13b, and the screws SM are disposed in the protruding end portions thereof. The reinforcement members 34 are disposed so as to abut on the panel pressing portion 13a and the side walls 13b. In this configuration, the wiring passages 30 are formed in the protruding base portions of the side walls 13b of the frame 13, which is the holding member disposed on the display surface 11c side. This allows the screws SM to be disposed in the protrusion end portions thereof. In this manner, the screws SM are not disposed on the display surface 11c side in the liquid crystal display device 10, which makes it difficult to see the screws SM from the display surface 11c side. As a result, the exterior of the liquid crystal display device 10 can be made simpler. On the other hand, when the wiring passages 30 are formed in the protrusion base portions of the side walls 13b, the strength of the frame 13, which is the holding member, would be lowered, but because the reinforcement members 34 are disposed so as to abut on the side walls 13b and the panel pressing portion 13a, the reduction in strength of the frame 13, which is the holding member, can be sufficiently made up for.

Of the frame 13 and the chassis 14, which is the pair of the holding members, the wiring passages 30 are formed in the frame 13, which is the holding member disposed on the display surface 11c side, and the screws SM are inserted in the outer edge portion of the frame 13 and the chassis 14, which is the pair of holding members, from the side opposite to the display surface 11c side. With this configuration, the screws SM are disposed on the side opposite to the display surface 11c side in the liquid crystal display device 10, which makes it difficult to see the screws SM from the display surface 11c side. As a result, the exterior of the liquid crystal display device 10 can be made simpler.

Of the frame 13 and the chassis 14, which is the pair of holding members, the chassis 14 that is the holding member disposed on a side opposite to the display surface 11c side has the light guide plate receiving portion 14a1 disposed in parallel with a surface of the light guide plate 16 to receives the light guide plate 16, and the screw attachment portions (fastening member attachment portion) 14a3 that extend from the outer edges of the light guide plate receiving portion 14a1 such that the screws SM are disposed therein by piercing therethrough. The light guide plate receiving portion 14a1 and the screw attachment portions 14a3 are flush with each other. The frame 13, which is the holding member disposed on the display surface 11c side, has the wiring passages 30 formed therein to allow the wiring members 28 to pass through, and the chassis 14, which is the holding member disposed on the side opposite to the display surface 11c side, has the light guide plate receiving portion 14a1 and the screw attachment portions 14a3 that are flush with each other. This makes it possible to achieve a flat shape as a whole. As a result, the manufacturing cost for the chassis 14, which is the holding member disposed on the side opposite to the display surface 11c side is reduced, and this configuration is preferable in reducing the thickness of the liquid crystal display device 10.

Of the frame 13 and the chassis 14, which are the pair of the holding members, in the chassis 14 that is the holding member disposed on the side opposite to the display surface 11c side, the wiring line thru-holes 29 that are connected to the wiring passages 30 are formed to guide the wiring members 28 out of the chassis 14, which is the holding member. The power supply board (light source driver substrate) PWB, which is connected to the wiring members 28 led out through the wiring thru-holes 29 for driving the LEDs 17, and the cover member CV, which covers the wiring members 28 led out through the wiring thru-holes 29 together with the power supply board PWB, are attached to the chassis 14, which is the holding member having the wiring thru-holes 29 formed therein. In this configuration, the wiring members 28 connected to the LEDs 17 that are housed between the frame 13 and the chassis 14, which are the pair of holding members, are guided to the outside through the wiring thru-holes 29 formed in the chassis 14, which is the holding member disposed on the side opposite to the display surface 11c side, and the wiring members 28 are connected to the power supply board PWB, thereby making it possible to drive the LEDs 17. The wiring members 28 led out through the wiring thru-holes 29 and the power supply board PWB are covered by the cover member CV, and therefore, the power supply board PWB and the wiring members 28 are not externally visible, and as a result, the exterior of the liquid crystal display device 10 can be made simpler.

A plurality of the LEDs 17 are at least disposed on the respective sides across the light guide plate 16, the wiring passages 30 are formed so as to open toward the plurality of LEDs 17 disposed at the respective sides, and the wiring thru-holes 29, the power supply board PWB, and the cover member CV are disposed in positions closer to one of the respective sides where the plurality of LEDs 17 are disposed. In this configuration, the wiring members 28 connected to the respective LEDs 17 disposed on at least the respective sides across the light guide plate 16 respectively pass through the wiring passages 30 that open toward the LEDs 17 on the respective sides, and are led to the wiring thru-holes 29 located closer to one of the respective sides where the LEDs 17 are disposed. Because the wiring thru-holes 29, power supply board PWB, and cover member CV are located closer to one of the respective sides where the plurality of LEDs 17 are arranged, the sizes of the power supply board PWB and the cover member CV attached to the chassis 14, which is the holding member and the exterior member, can be maintained small, and therefore, it is possible to make the exterior of the liquid crystal display device 10 even simpler.

Embodiment 1 of the present invention has been described above, but the present invention is not limited to the embodiment above, and may include modification examples below, for example. In the modification examples below, components similar to those in the embodiment above are given the same reference characters, and descriptions and depictions thereof may be omitted.

Modification Example 1 of Embodiment 1

Modification Example 1 of Embodiment 1 will be described with reference to FIG. 15. In this example, a positioning buffer member 38 that abuts on an end face of a liquid crystal panel 11-1 is attached to a reinforcement member 34-1.

Figure 15:
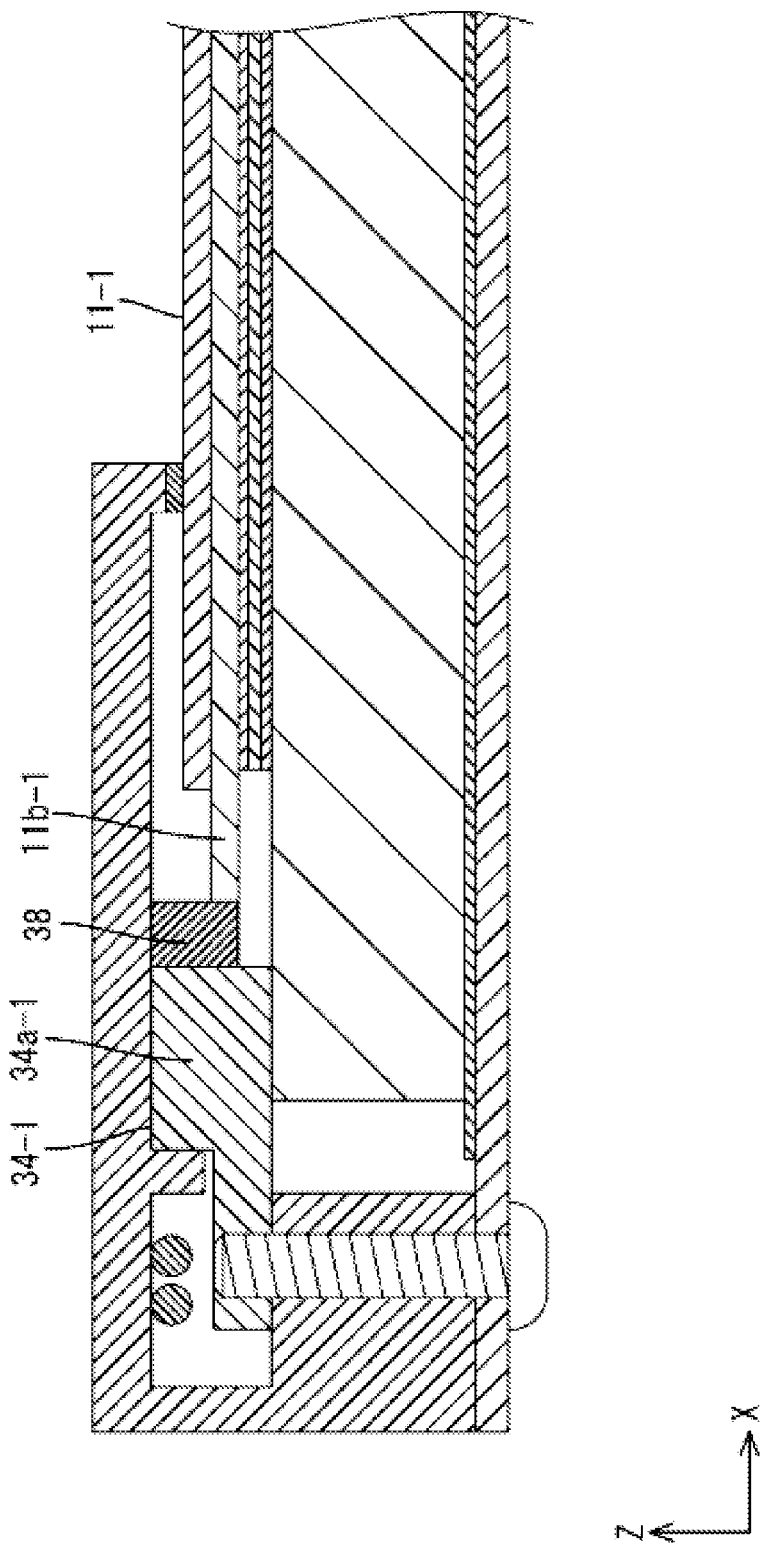
FIG. 15 is a cross-sectional view showing a cross-sectional configuration of a reinforcement member and positioning buffer member of Modification Example 1 of Embodiment 1.

As shown in FIG. 15, the positioning buffer member 38 that abuts on an end face of the liquid crystal panel 11-1 is attached to the reinforcement member 34-1 of this modification example. The positioning buffer member 38 is made of a foam resin material, for example, thereby having excellent buffering characteristics. The positioning buffer member 38 is attached to a side face of a first portion 34a-1 of the reinforcement member 34-1, the side face facing an array substrate 11b-1 of the liquid crystal panel 11-1, and the positioning buffer member 38 is interposed between the array substrate 11b-1 of the liquid crystal panel 11-1 and the first portion 34a-1. The positioning buffer member 38 is disposed so as to extend along the side face of the first portion 34a-1 in substantially the entire length thereof, and abuts on a shorter side edge of the array substrate 11b-1 of the liquid crystal panel 11-1 in substantially the entire length thereof. Therefore, in installing the liquid crystal panel 11-1 in the manufacturing process, by having the shorter side edges of the array substrate 11b-1 make contact with the positioning buffer members 38 in substantially the entire length, the liquid crystal panel 11-1 can be positioned with respect to the X axis direction, and due to the buffering characteristics thereof, the liquid crystal panel 11-1 can be prevented from being damaged and the like.

As described above, with this modification example, the reinforcement member 34-1 is provided with the positioning buffer member 38 that is located outside of the liquid crystal panel 11-1 and that abuts on an end face of the liquid crystal panel 11-1. In this configuration, the positioning buffer members 38 located outside of the liquid crystal panel 11-1 abut on end faces of the liquid crystal panel 11-1, thereby making it possible to position the liquid crystal panel 11-1 while absorbing shock. Therefore, in the manufacturing process, the step to install the liquid crystal panel 11-1, and the like can be made easier.

Modification Example 2 of Embodiment 1

Modification Example 2 of Embodiment 1 will be described with reference to FIG. 16. In this example, a reinforcement member 34-2 is constituted of a second portion 34b-2 only.

Figure 16:
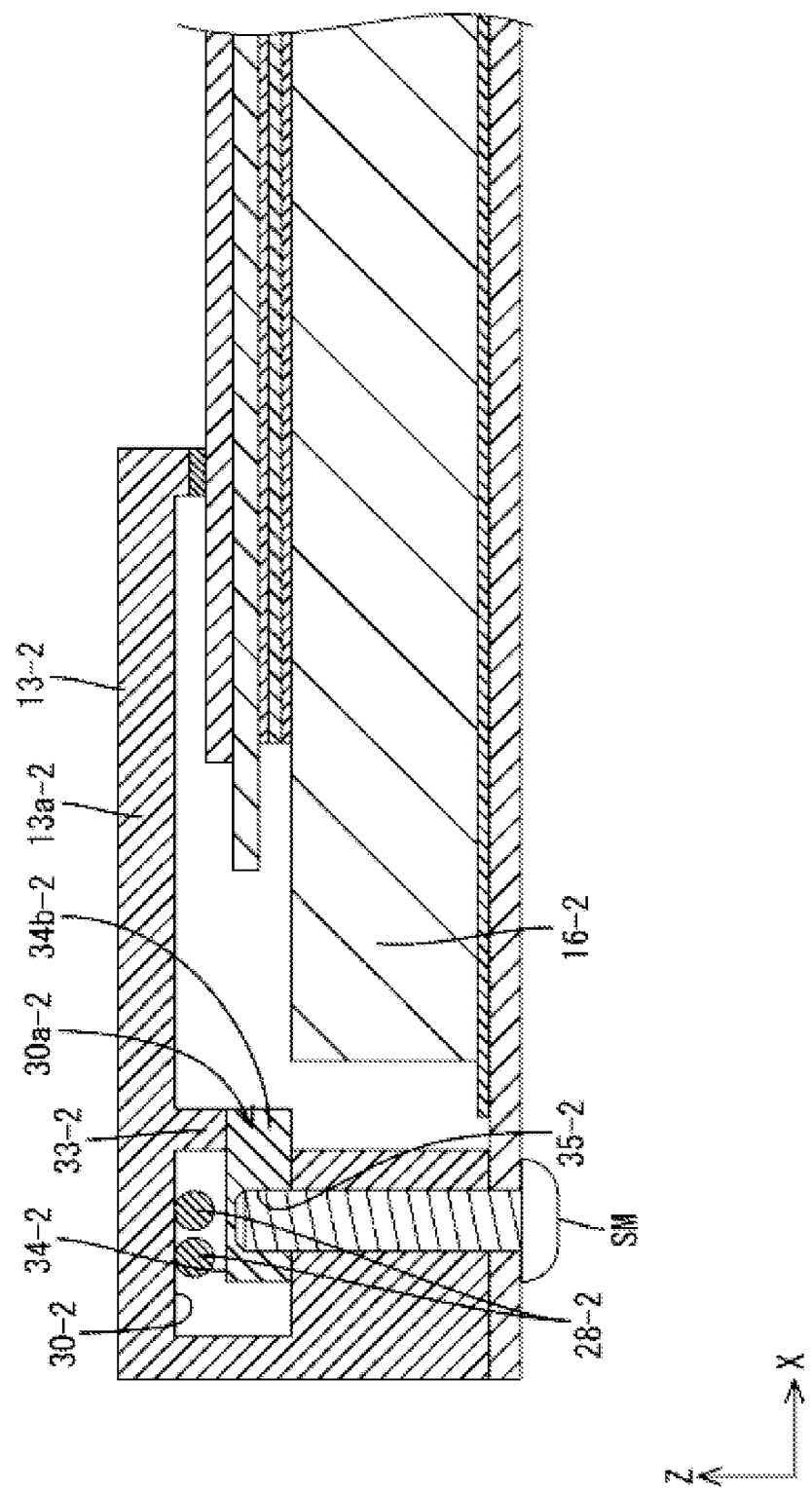
FIG. 16 is a cross-sectional view showing a cross-sectional configuration of a reinforcement member of Modification Example 2 of Embodiment 1.

As shown in FIG. 16, the reinforcement member 34-2 of this modification example is constituted of the second portion 34b-2 only that is inserted into a wiring passage 30-2, and does not have the first portion 34a described in Embodiment 1 above. Therefore, the reinforcement member 34-2 does not abut on a light guide plate 16-2 or a panel pressing portion 13a-2 of a frame 13-2. The reinforcement member 34-2 is formed in a square rod shape that extends along the Y axis direction (extension direction of the wiring passage 30-2, wiring path of a wiring member 28-2), and the cross-sectional shape thereof is a horizontally-long quadrangle. The entire reinforcement member 34-2 is inserted into the wiring passage 30-2, and abuts on an inner surface of the wiring passage 30-2 closer to the rear side (screw SM side) and a protrusion end face of a protrusion 33-2, thereby blocking an opening 30a-2. The reinforcement member 34-2 has a screw hole 35-2.

<Embodiment >2

Embodiment 2 of the present invention will be described with reference to FIGS. 17 to 20. In Embodiment 2, LED units LUA and LUB are respectively disposed at respective sides of a light guide plate 116. Descriptions of structures, operations, and effects similar to those of Embodiment 1 will be omitted.

Figure 17:
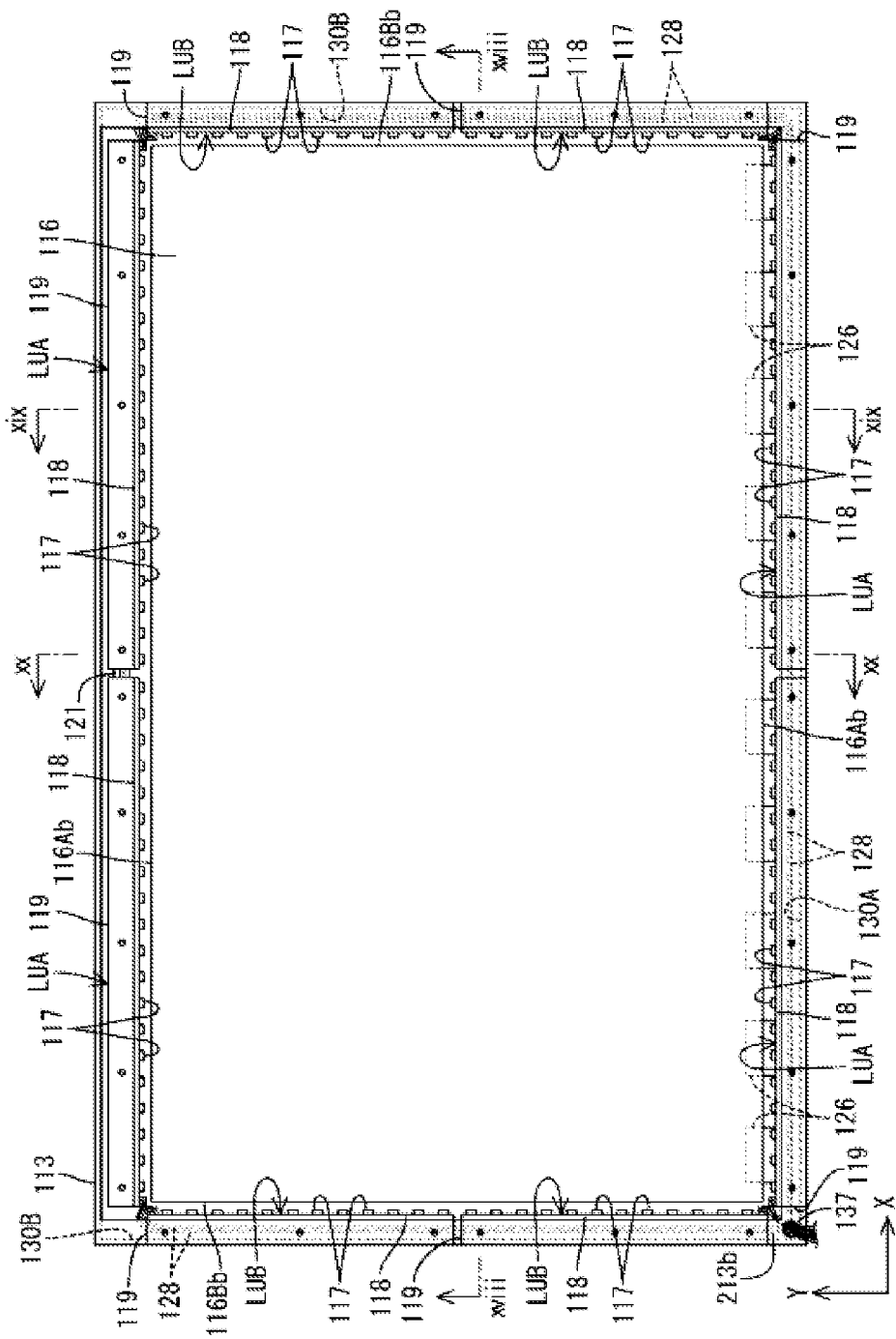
FIG. 17 is a rear view of the liquid crystal display device of Embodiment 2 of the present invention from which a chassis is removed.
Figure 18:
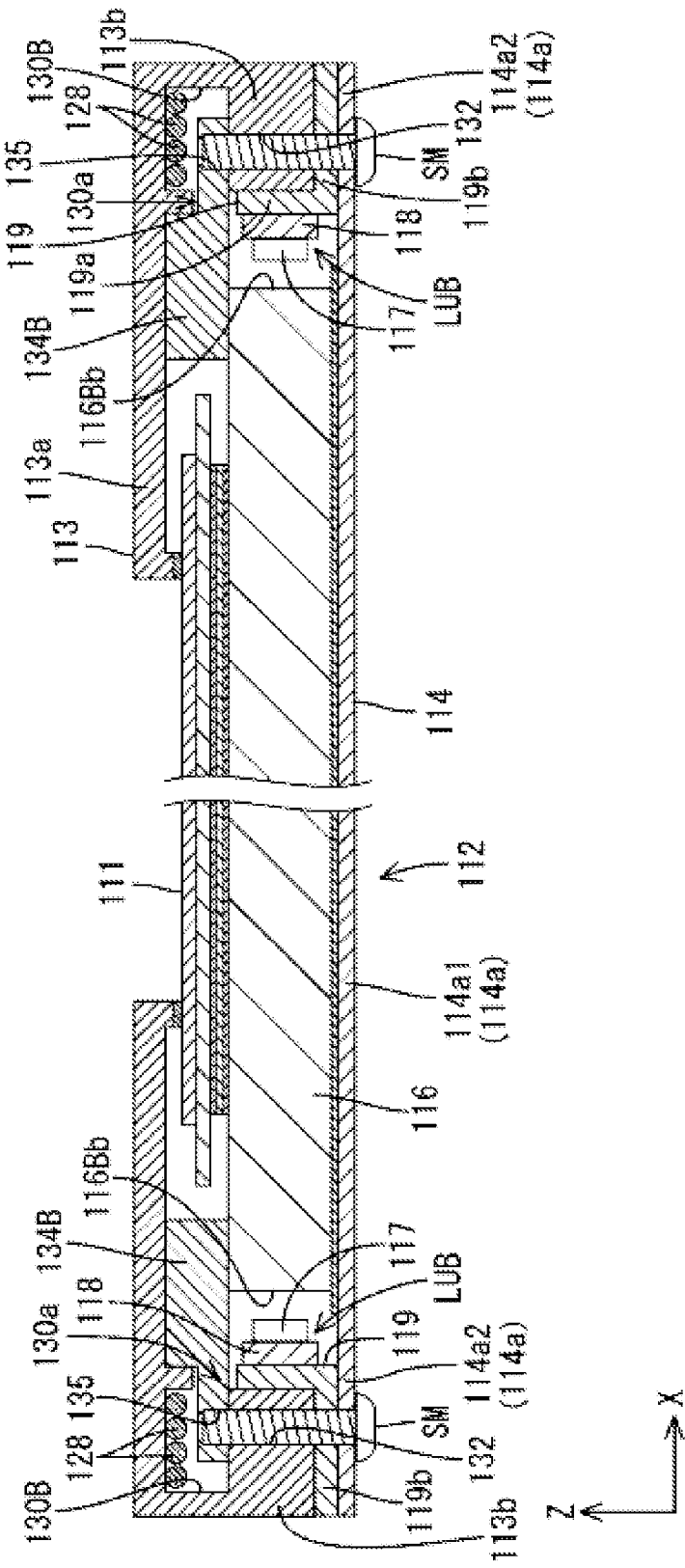
FIG. 18 is a cross-sectional view of FIG. 17 along the line xviii-xviii.

As shown in FIG. 17, a backlight device 112 of the present embodiment includes two sets (four total) of first LED units LUA that are disposed at the respective sides across the light guide plate 16 in the shorter side direction (Y axis direction), each two of which having the light guide plate 116 therebetween form a pair, and two sets of second LED units LUB that are disposed at the respective sides across the light guide plate 16 in the longer side direction (X axis direction), each two of which having the light guide plate 116 therebetween form a pair. Among the two types of the LED units, the configuration of the first LED unit LUA is the same as that of the LED unit LU described in Embodiment 1 above, and therefore, the description thereof is not repeated. As shown in FIGS. 17 and 18, the LED substrate 118 and the heat-dissipating member 119 of each second LED unit LUB extend along the shorter side direction of the light guide plate 116, and on each LED substrate 118, a plurality of LEDs 117 are arranged at intervals along the lengthwise direction (Y axis direction). The heat-dissipating member 119 of the second LED unit LUB is constituted of an LED attachment portion 119a to which the LED substrate 118 is attached, and a heat-dissipating portion 119b that protrudes outwardly from the LED attachment portion 119a along the X axis direction. As shown in FIG. 17, among the outer side faces of the light guide plate 116, the two longer side faces are first light-receiving surfaces 116Ab facing the respective LEDs 117 of the first LED units LUA. On the other hand, the two shorter side faces are second light-receiving surfaces 116Bb facing the respective LEDs 117 of the second LED units LUB. In the bottom plate 114a of the chassis 114, the center portion thereof is a light guide plate receiving portion 114a1, while outer edge portions that surround the light guide plate receiving portion 114a1 are LED unit receiving portions 114a2 that contact respective heat-dissipating portions 119b of the heat-dissipating members 119 of the respective LED units LUA and LUB.

Next, the wiring paths of the wiring members 128 that are connected to the respective LED units LUA and LUB will be explained. As shown in FIG. 17, wiring passages 130 through which the wiring members 128 pass are formed respectively in the two shorter side portions and one longer side portion on the lower side of FIG. 17 (closer to wiring thru-hole 137, closer to flexible substrates 126) of side walls 113b of a frame 113, i.e., three sides thereof, and adjacent wiring passages are connected to each other at the respective corners. Only one wiring thru-hole 137, which is used to lead out the wiring members 128 placed in the wiring passages 130, is formed near the left bottom corner of FIG. 17 in the side walls 113b of the frame 113. Therefore, the respective wiring members 128 connected to one first LED unit LUA and one second LED unit LUB disposed on the left top part of FIG. 17 (on the same side as the wiring thru-hole 137) are passed through the second wiring passage 130B formed in the shorter side portion of the side walls 113b on the left side of FIG. 17, thereby reaching the wiring thru-hole 137. On the other hand, the respective wiring members 128 connected to the two first LED units LUA and two second LED units LUB disposed on the right side of FIG. 17 (opposite to the side where the wiring thru-hole 137 is present) are passed through the second wiring passage 130B formed in the shorter side portion of the side walls 113b on the right side of FIG. 17 and the first wiring passage 130A formed in the longer side portion on the lower side of FIG. 17, thereby reaching the wiring thru-hole 137. Specifically, the respective wiring members 128 connected to one first LED unit LUA and one second LED unit LUB adjacent to each other across the opposing corner of the wiring thru-hole 137, among the two first LED units LUA and two second LED units LUB located on the right side of FIG. 17, are passed through the first wiring passage 130A and second wiring passage 130B, i.e., two wiring passages, thereby being bent into a substantially L shape. On the other hand, the respective wiring members 128 connected to one first LED unit LUA and one second LED unit LUB adjacent to each other across the corner that is line-symmetrical with the wiring thru-hole 137 are passed through the first wiring passage 130A formed in the longer side portion of the side walls 113b only. Although not shown in the figure, only one wiring thru-hole connected to the wiring thru-hole 137 is formed in the bottom plate 114a of the chassis 114, and by the wiring thru-hole, the wiring members 128 can be led out to the rear side of the chassis 114.

Figure 19:
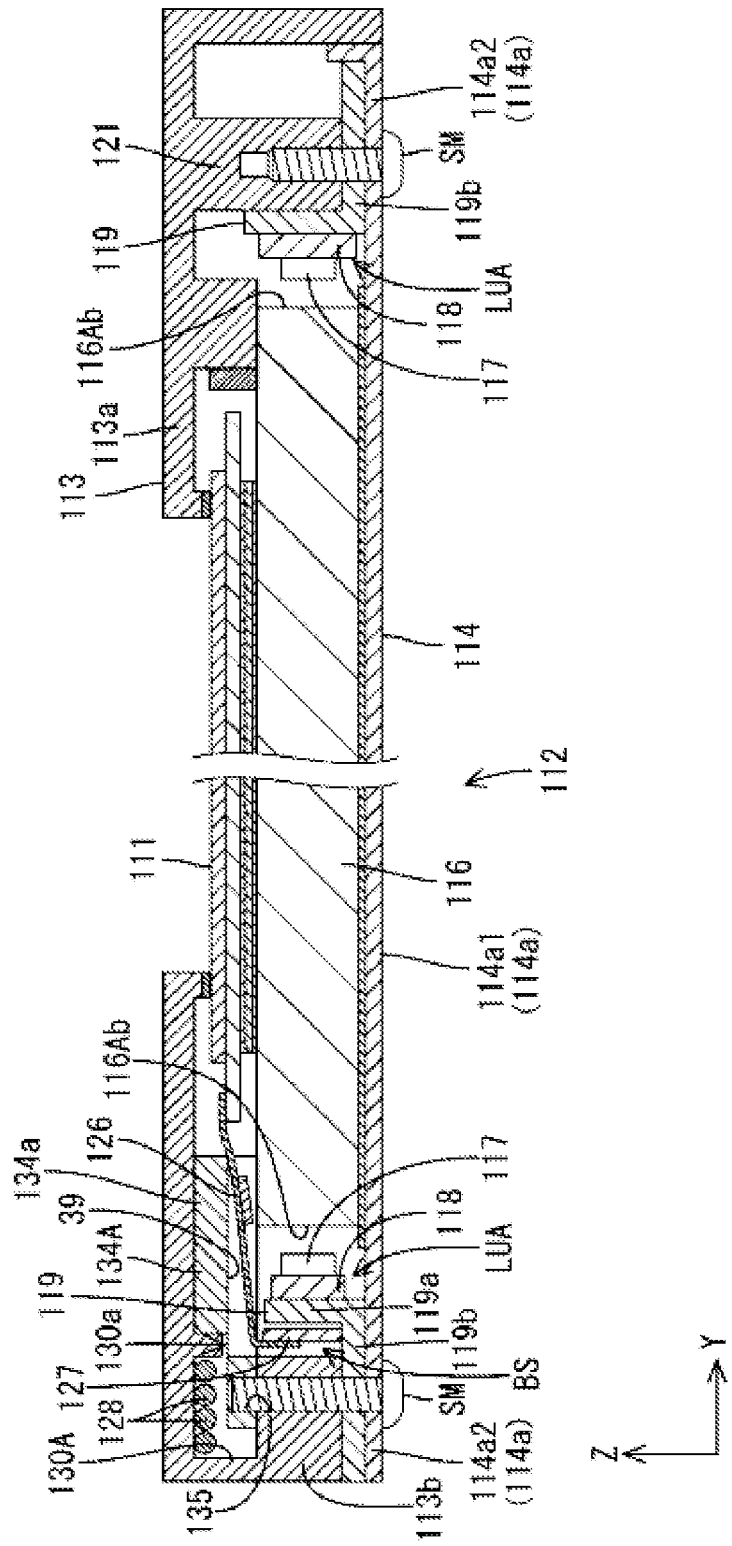
FIG. 19 is a cross-sectional view of FIG. 17 along the line xix-xix.
Figure 20:
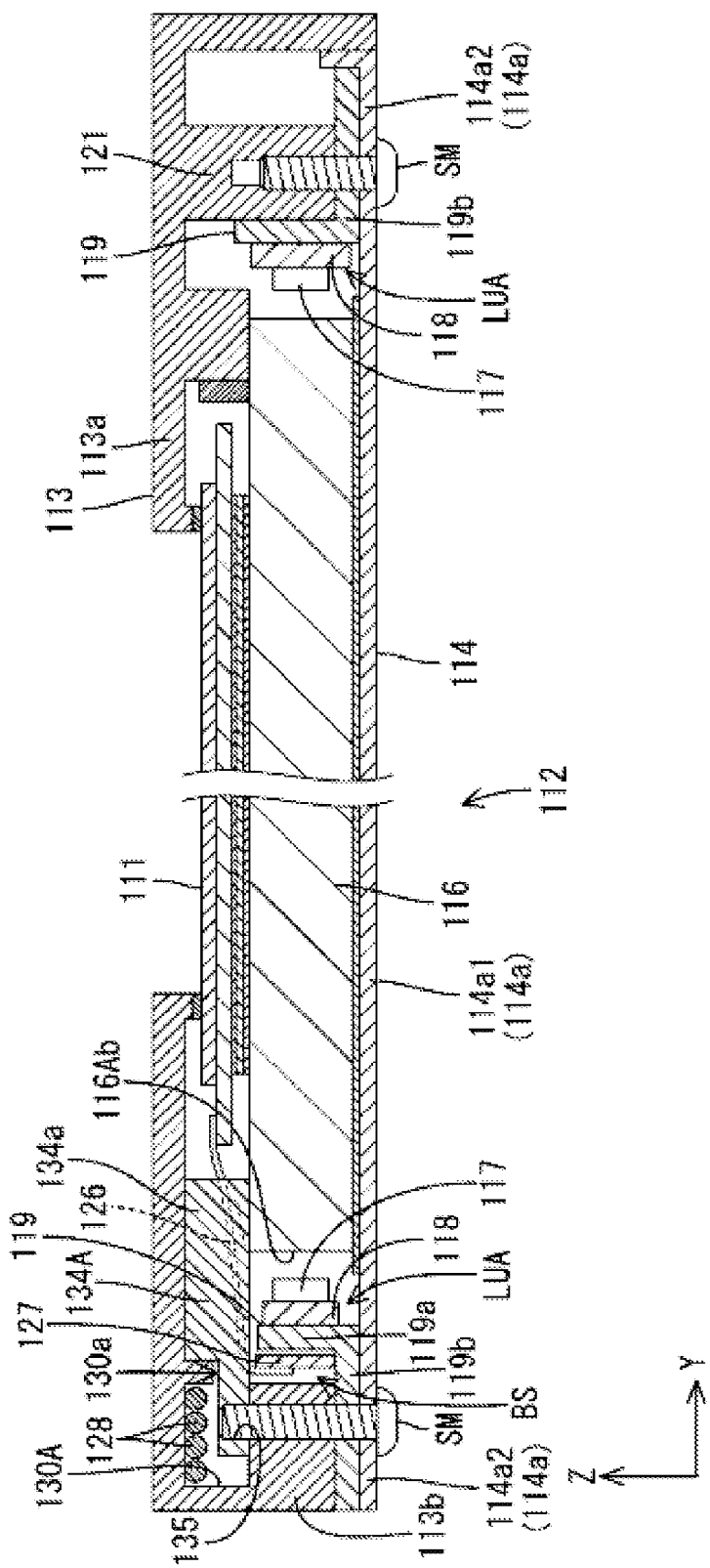
FIG. 20 is a cross-sectional view of FIG. 17 along the line xx-xx.

Next, the attachment structure of the respective LED units LUA and LUB will be explained. As shown in FIGS. 19 and 20, among the first LED units LUA that form the pairs, the first LED units LUA located on the lower side of FIG. 17 (left side of FIGS. 19 and 20) are fastened by the screws SM such that the heat-dissipating portion 119b of the heat-dissipating member 119 is sandwiched between the longer side portion of the side walls 113b of the frame 113 that has the wiring passage 130, and the LED unit receiving portion 114a2 of the bottom plate 114a of the chassis 114. On the other hand, among the first LED units LUA, the first LED units LUA located at the upper side of FIG. 17 (right side of FIGS. 19 and 20) are fastened by the screws SM such that the heat-dissipating portion 119b is sandwiched between the protruding member 121 of the frame 113 and the LED unit receiving portion 114a2 of the bottom plate 114a of the chassis 114 in the manner similar to the LED unit LU described in Embodiment 1 above. A substrate housing space BS in which a printed board 127 is housed is formed between the LED attachment portion 119a of the heat-dissipating member 119 of the first LED unit LUA on the left side of FIG. 19, and the side wall 113b of the frame 113 having the first wiring passage 130A. The frame 113 is further provided with a first reinforcement member 134A that closes an opening 130a of the first wiring passage 130A. The first reinforcement member 134A extends along the X axis direction, or in other words, the lengthwise direction of the first wiring passage 130A. In the first reinforcement member 134A, flexible substrate passages 39 through which flexible substrates 126 pass are formed. The flexible substrates 126 are connected to the printed board 127 and the liquid crystal panel 111. The flexible substrate passages 39 are formed as a plurality of notches arranged at intervals along the extension direction of the first reinforcement member 134A. The arrangement thereof is consistent with the arrangement of the respective flexible substrates 126. The flexible substrate passages 39 are each formed by making a notch extending in the Y axis direction over the entire first portion 134a (light guide plate supporting portion) of the first reinforcement member 134A that abuts on both the light guide plate 116 and the panel pressing portion 113a of the frame 113. In the first reinforcement member 134A, screw holes 135 that engage the shaft portions of the screws SM are formed.

As shown in FIG. 18, the respective second LED units LUB are fastened by the screws SM such that the respective heat-dissipating portions 119b of the heat-dissipating members 119 are sandwiched by the respective shorter side portions of the side walls 113b of the frame 113 and the respective LED unit receiving portions 114a2 of the bottom plate 114a of the chassis 114. In the respective shorter side portions of the side walls 113b of the frame 113, screw thru-holes 132 through which the screws SM pass are formed so as to open in the second wiring passages 130B, respectively. The second reinforcement members 134B are attached to the frame 113 so as to block openings 130a of the respective second wiring passages 130B, and in the second reinforcement members 134B, screw holes 135 that engage the respective shaft portions of the screws SM that passed through the screw thru-holes 132 described above are formed.

As described above, in the present embodiment, a plurality of flexible substrates 126 arranged at intervals along an edge of the liquid crystal panel 111 are connected to that edge, and a plurality of flexible substrate passages 139 through which the plurality of flexible substrates 126 pass are formed in the reinforcement member 134 that includes the first portion (light guide plate supporting portion) 134a so as to be arranged at intervals along the edge of the liquid crystal panel 111. In this manner, although the reinforcement member 134 has a plurality of flexible substrate passages 139 through which the plurality of flexible substrates 126 pass, because the flexible substrate passages 139 are arranged at intervals, the reinforcement member 134 can sufficiently fulfill the reinforcement function for the frame 113 that is the holding member having the wiring passages 130 and the supporting function for the light guide plate 116.

<Embodiment 3>

Embodiment 3 of the present invention will be described with reference to FIGS. 21 to 23. In Embodiment 3, the arrangement of the pairs of LED units LU is modified from the configuration of Embodiment 1 above. Descriptions of structures, operations, and effects similar to those of Embodiments 1 and 2 will be omitted.

Figure 21:
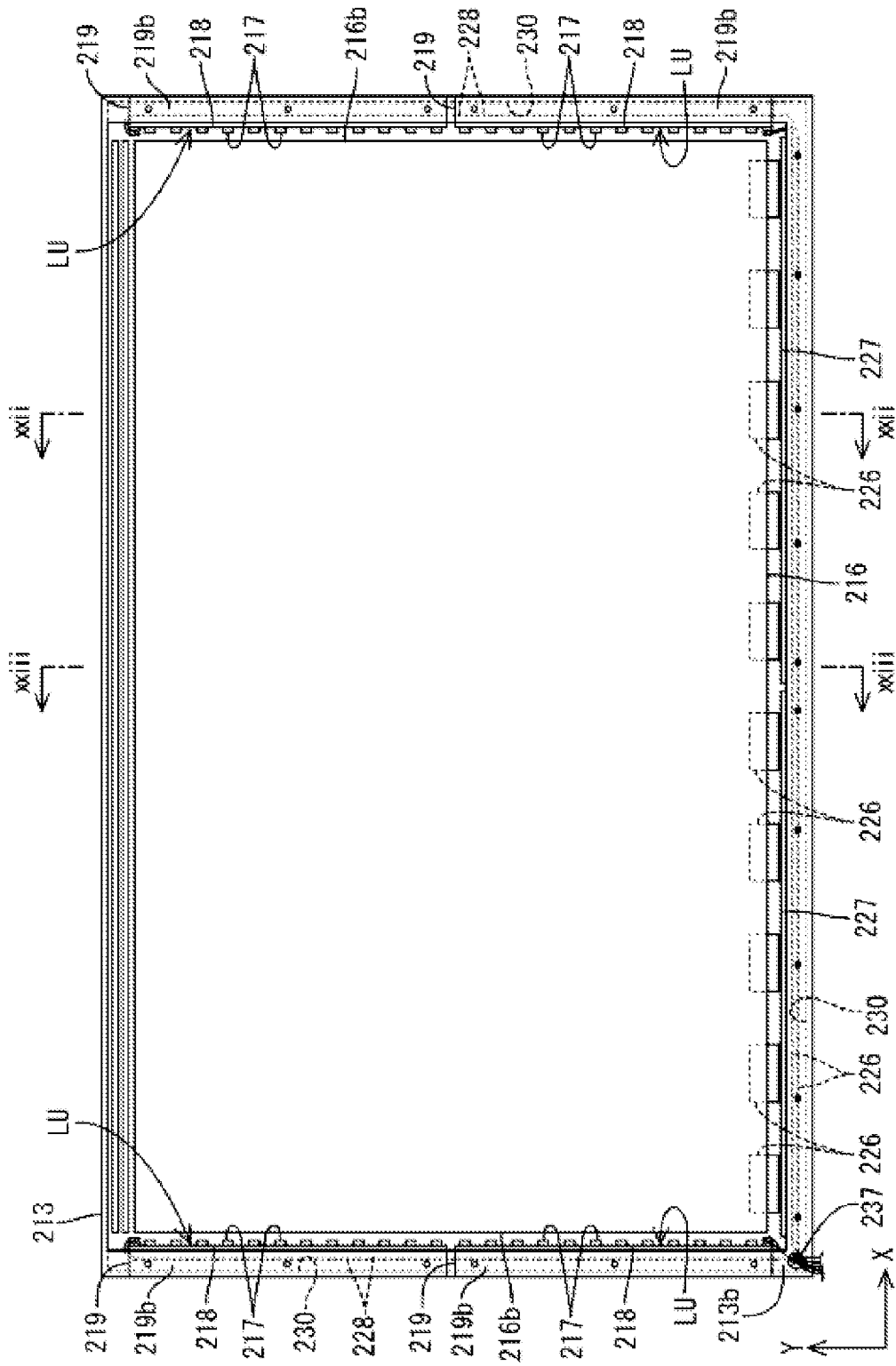
FIG. 21 is a rear view of the liquid crystal display device of Embodiment 3 of the present invention from which a chassis is removed.

As shown in FIG. 21, the LED units LU of the present embodiment are disposed such that each pair is constituted of two LED units LU disposed at the respective sides across a light guide plate 216 in the longer side direction (X axis direction). An LED substrate 218 and heat-dissipating member 219 constituting each LED unit LU extend along the shorter side direction of the light guide plate 216, and on the LED substrate 218, a plurality of LEDs 217 are arranged at intervals along the lengthwise direction (Y axis direction). On the other hand, among outer side faces of the light guide plate 216, two shorter side faces are respectively light-receiving surfaces 216b that face the respective LEDs 217 of the LED units LU. Although not shown in the figure, in a bottom plate 214a of a chassis 214, respective shorter side edges are LED unit receiving portions that abut on heat-dissipating portions 219b of the respective heat-dissipating members 219 in the LED units LU. Because the attachment structure of the LED unit LU is the same as the second LED unit LUB described in Embodiment 2 above (see FIG. 18), the descriptions thereof are not repeated.

The wiring paths of wiring members 228 connected to the respective LED units LU of the present embodiment are substantially the same as Embodiment 2 above. That is, as shown in FIG. 21, wiring passages 230 through which the wiring members 228 pass are formed at three sides of side walls 213b of the frame 213, which are the respective shorter sides and one longer side on the bottom of FIG. 21 (the side closer to a wiring thru-hole 237 and flexible substrates 226). Respective adjacent wiring passages are connected to each other at the corners. Only one wiring thru-hole 237, which is provided to lead out the wiring members 228 passing through the wiring passages 230, is formed at the left bottom corner of FIG. 21 in the side walls 213b of the frame 213. Therefore, the respective wiring members 228 connected to the two LED units LU on the left side (the side where the wiring thru-hole 237 is formed) of FIG. 21 are passed through the wiring passage 230 formed in the left shorter side of the side walls 213b, thereby reaching the wiring thru-hole 237. On the other hand, the respective wiring members 228 connected to the two LED units LU on the right side (opposite to the side where the wiring thru-hole 237 is formed) of FIG. 21 are passed through the wiring passage 230 formed in the right shorter side and the wiring passage 230 formed in the longer side on the bottom of the side walls 213b, respectively, thereby reaching the wiring thru-hole 237 while being bent in a substantially L shaped. Although not shown in the figure, only one wiring thru-hole connected to the wiring thru-hole 237 is formed in the bottom plate 214a of the chassis 214, and by this wiring thru-hole, the wiring members 228 can be led out to the rear side of the chassis 214.

Figure 22:
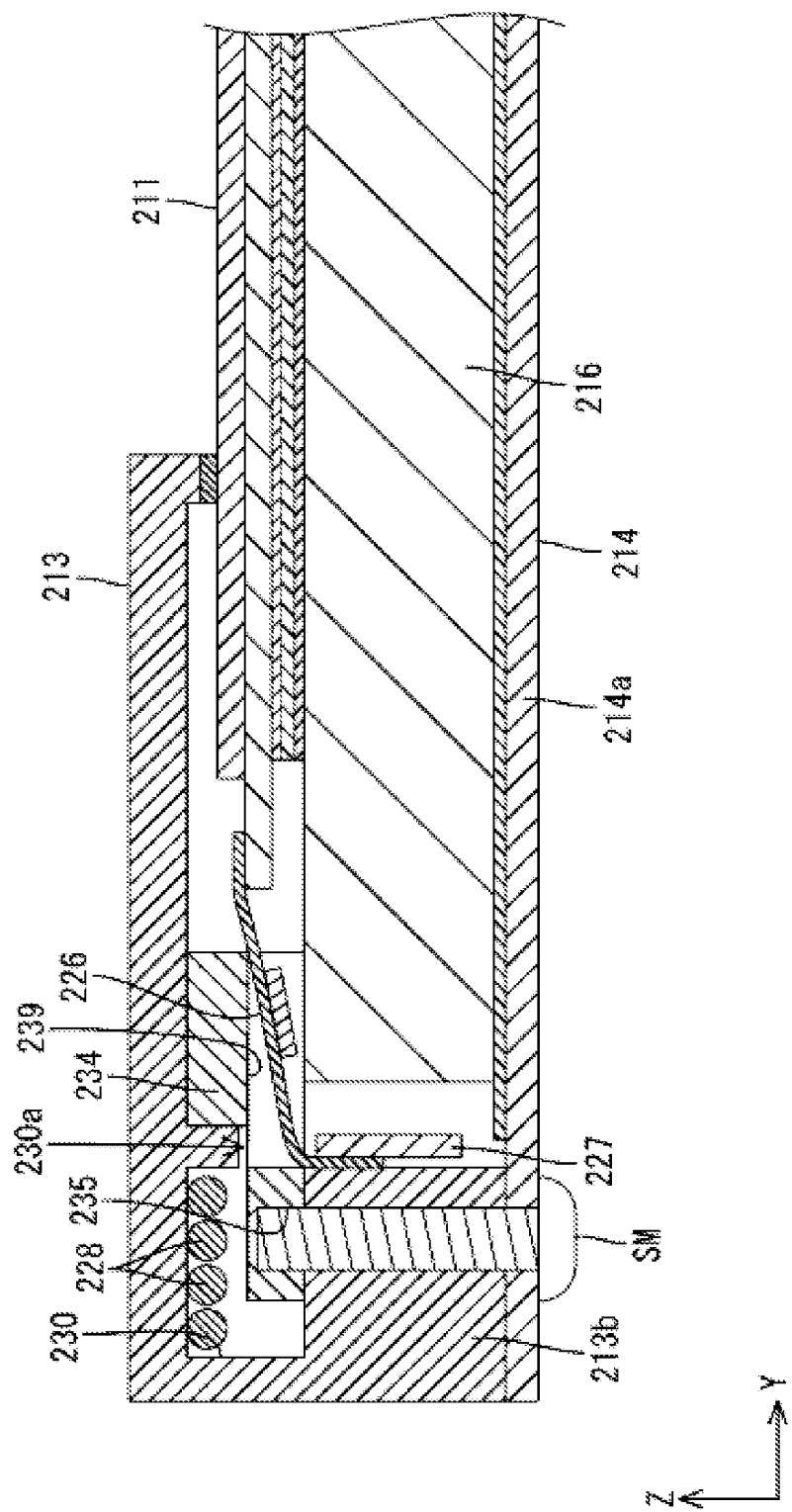
FIG. 22 is a cross-sectional view of FIG. 21 along the line xxii-xxii.
Figure 23:
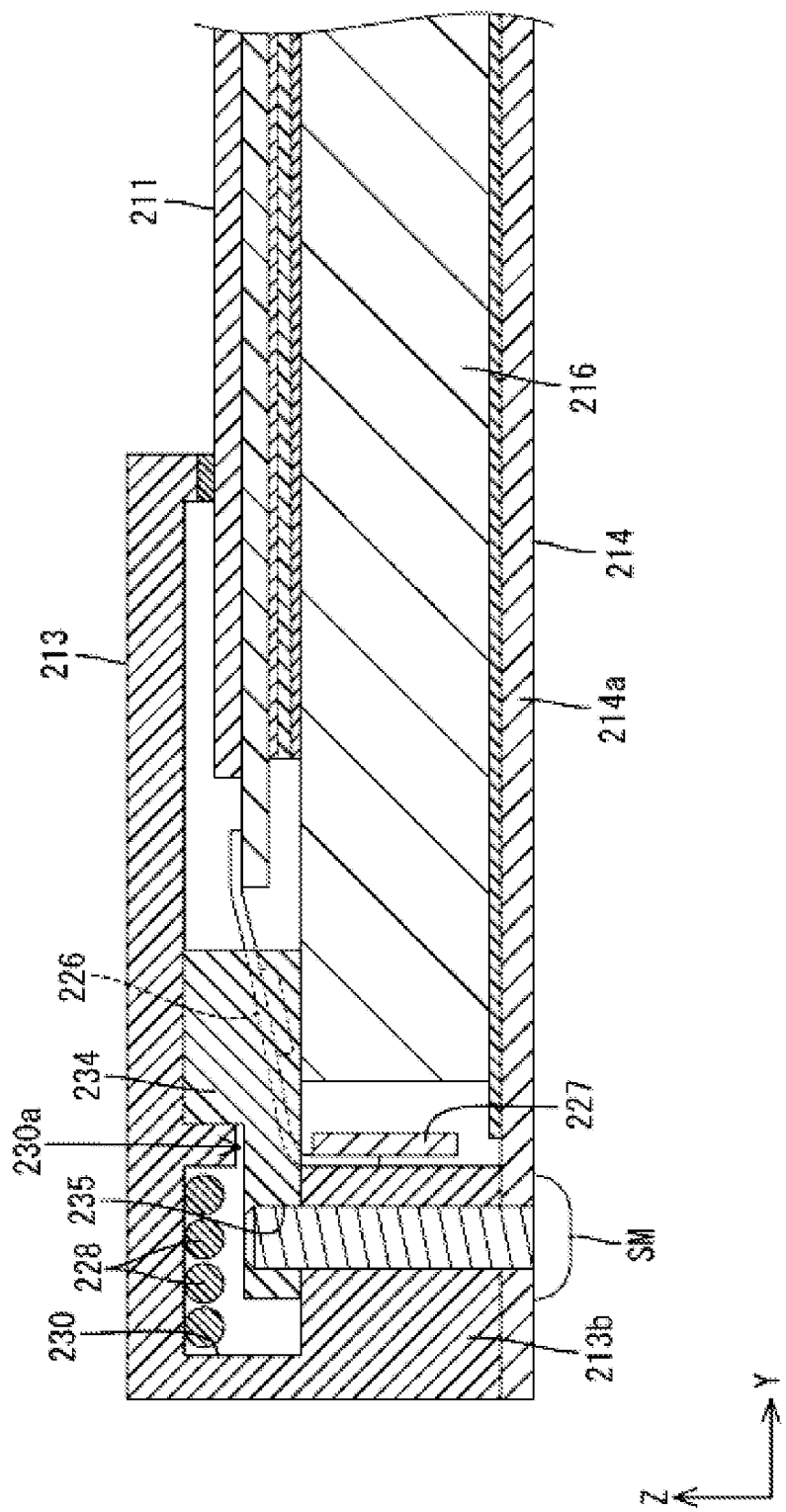
FIG. 23 is a cross-sectional view of FIG. 21 along the line xxiii-xxiii.

As shown in FIGS. 22 and 23, a printed board 227 is attached to the inner surface (surface facing the light guide plate 216) of the longer side portion where the wiring passage 230 is formed, among the respective longer side portions of the side walls 213b of the frame 213. On the other hand, in the frame 213, reinforcement members 234 are disposed respectively so as to close openings 230a of the respective wiring passages 230. The respective reinforcement members 234 extend along the lengthwise direction of the respective wiring passages 230. In the respective reinforcement members 234, screw holes 235 that engage the shaft portions of the respective screws SM are formed. In the reinforcement member 234 that is inserted into the wiring passage 230 formed in the longer side portion of the side walls 213b, or in other words, in the reinforcement member 234 that does not overlap the LED unit LU in a plan view, flexible substrate passages 239 are formed to allow flexible substrates 226 connected to printed boards 227 and a liquid crystal panel 211 to pass through. Other configurations of the flexible substrate passages 239 and the respective reinforcement members 234 are the same as those of the flexible substrate passages 39 and the respective reinforcement members 134A and 134B, and therefore, the descriptions thereof are not repeated.

<Embodiment >4

Embodiment 4 of the present invention will be described with reference to FIG. 24. Embodiment 4 is a modification example of Embodiment 2 above, and a heat-dissipating member is omitted from an LED unit LU. Descriptions of structures, operations, and effects similar to those of Embodiment 2 will be omitted.

Figure 24:
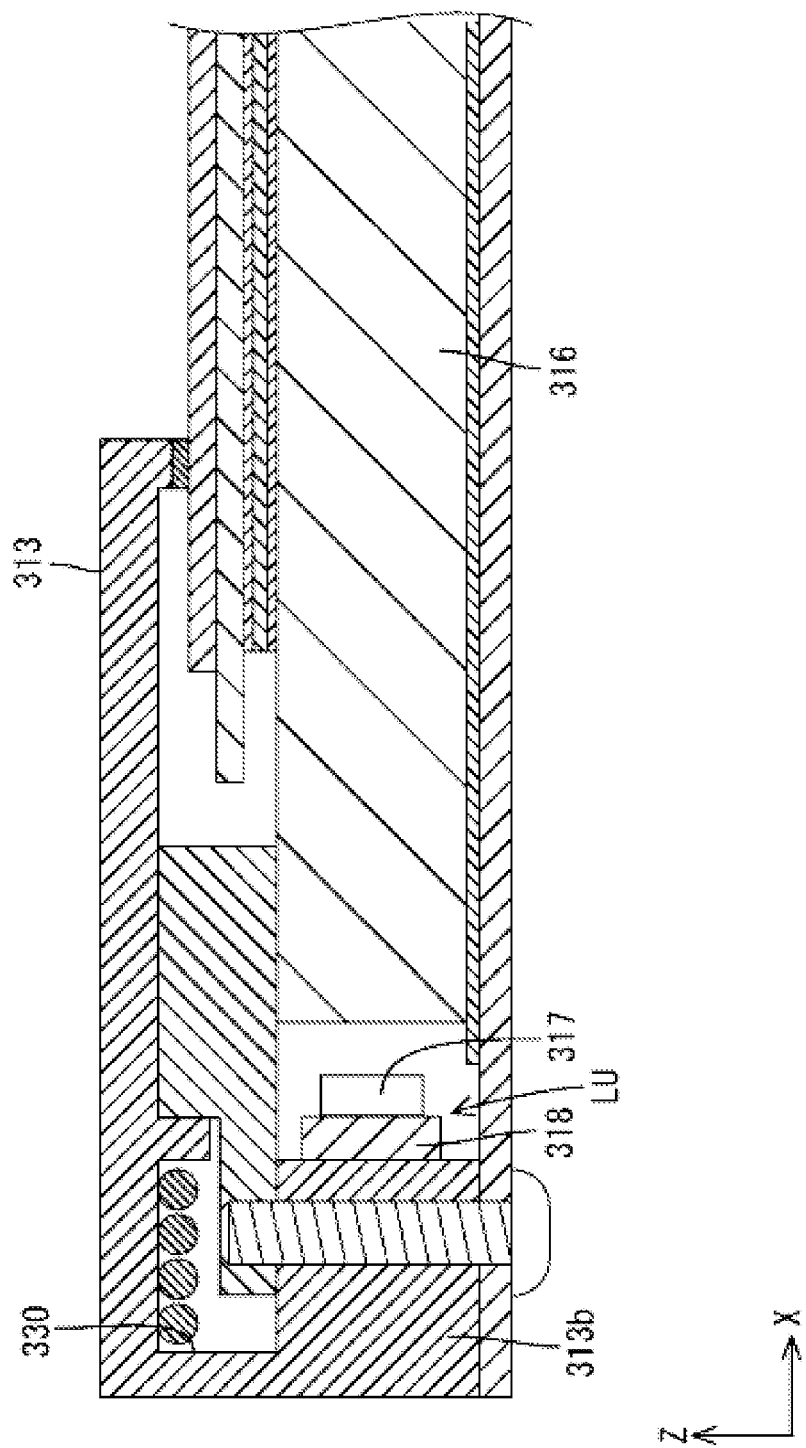
FIG. 24 is a cross-sectional view showing a cross-sectional configuration of an LED unit and wiring passage of Embodiment 4 of the present invention.

As shown in FIG. 24, the LED unit LU of the present embodiment is constituted of a plurality of LEDs 317 and an LED substrate 318 on which the plurality of LEDs 317 are mounted. The present embodiment differs from Embodiment 2 above in not having a heat-dissipating member. The LED unit LU is attached to a frame 313 by directly attaching the LED substrate 318 to the inner surface (surface facing a light guide plate 316) of a side wall 313b of the frame 313 where a wiring passage 330 is formed. The LED substrate 318 is affixed to the side wall 313b by a not-shown adhesive, double-sided tape, screw, or the like.

<Embodiment >5

Embodiment 5 of the present invention will be described with reference to FIG. 25 or 26. Embodiment 5 is a modification example of Embodiment 2 above, and uses a heat-dissipating reinforcement member 40 constructed by forming the heat-dissipating member and reinforcement member shown in Embodiment 2 integrally with each other. Descriptions of structures, operations, and effects similar to those of Embodiment 2 will be omitted.

Figure 25:
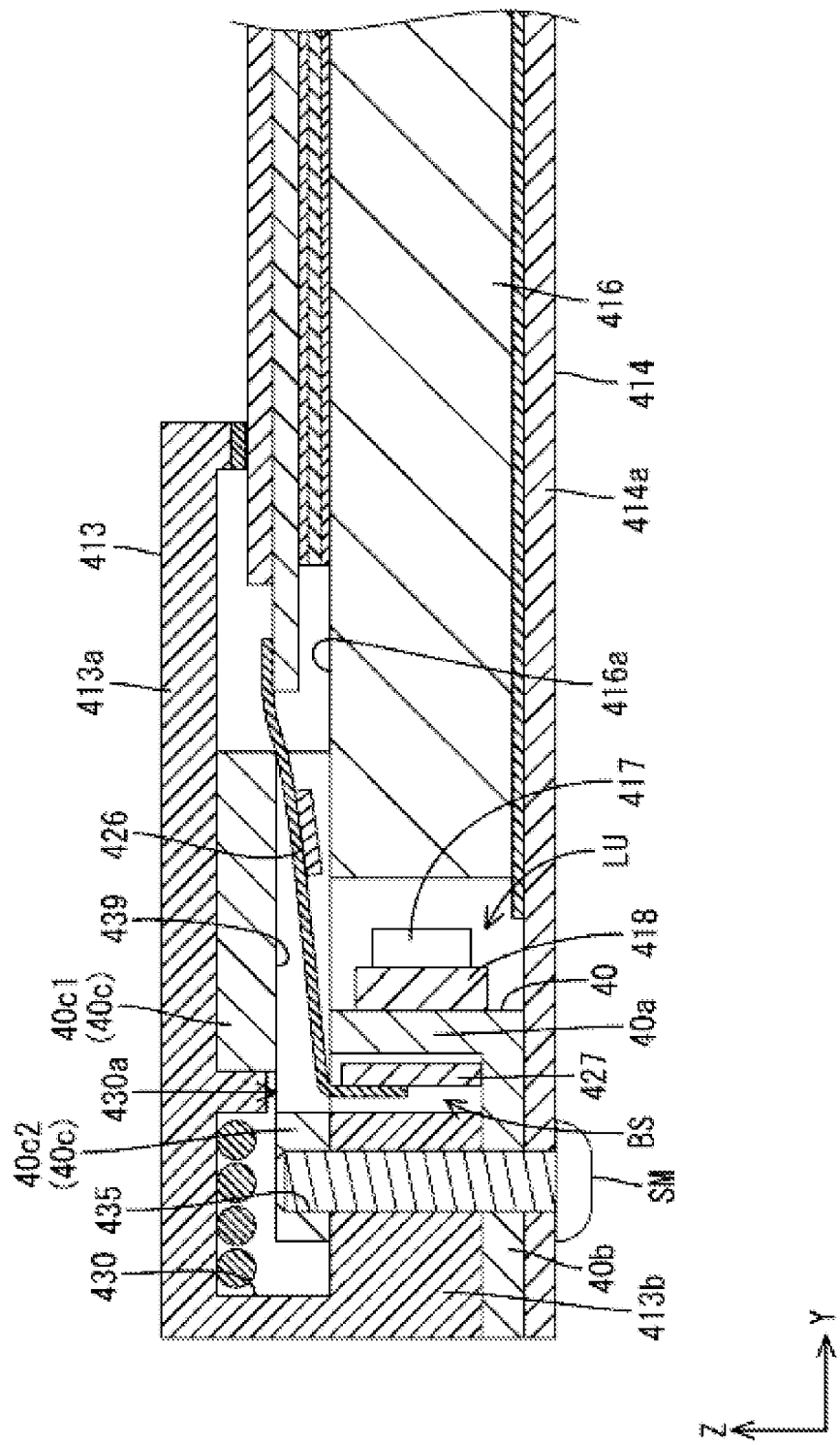
FIG. 25 is a cross-sectional view showing a cross-sectional configuration of a heat-dissipating reinforcement member and wiring passage of Embodiment 5 of the present invention, the figure illustrating a section of the heat-dissipating reinforcement member cut at a position where the flexible substrate passage is formed.
Figure 26:
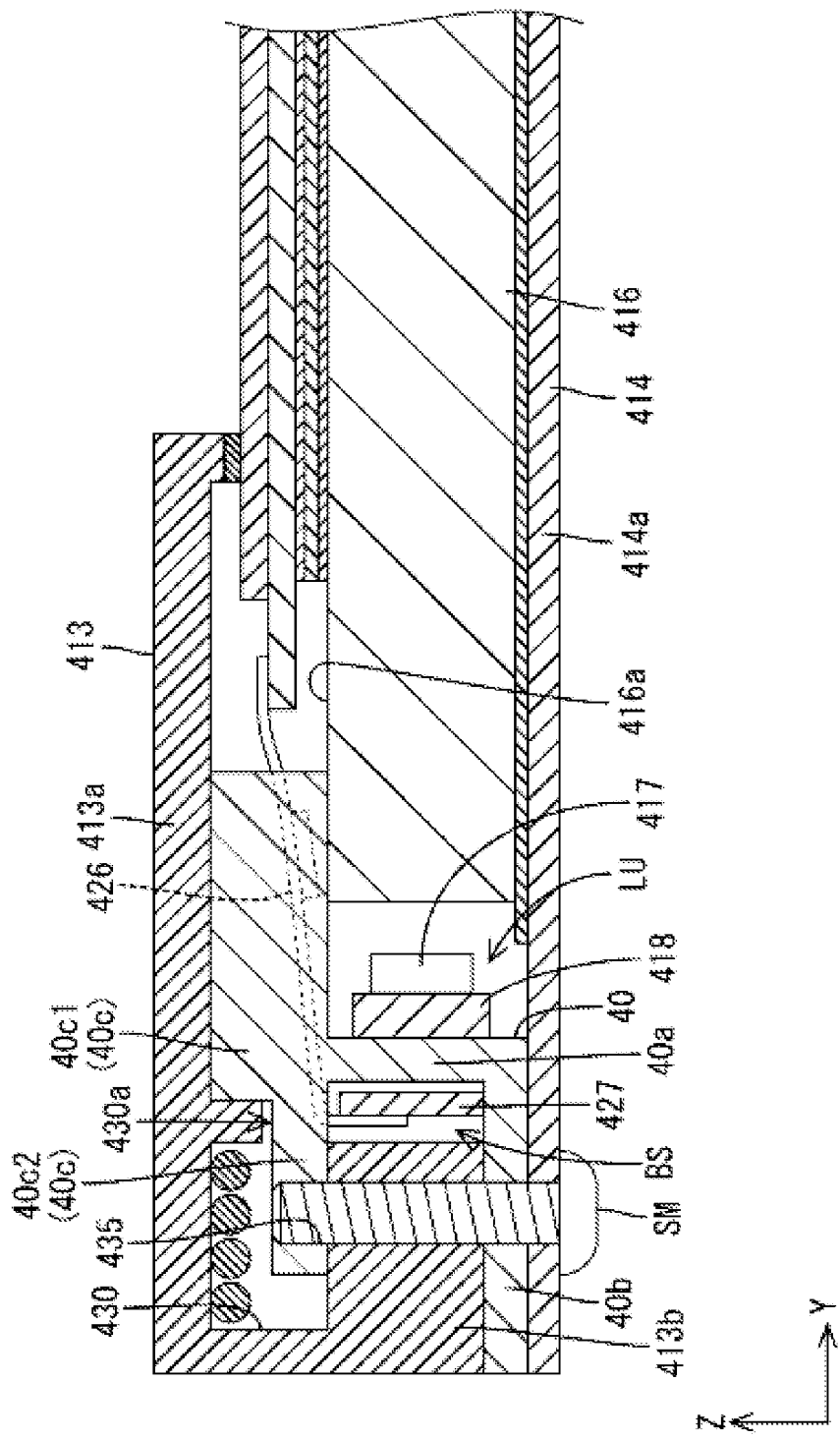
FIG. 26 is a cross-sectional view showing a cross-sectional configuration of the heat-dissipating reinforcement member and wiring passage, the figure illustrating a section of the heat-dissipating reinforcement member cut at a position where the flexible substrate passage recess is not formed.

As shown in FIGS. 25 and 26, an LED unit LU of the present embodiment is constituted of a plurality of LEDs 417, an LED substrate 418 on which the plurality of LEDs 417 are mounted, and a heat-dissipating reinforcement member 40 to which the LED substrate 418 is attached. The heat-dissipating reinforcement member 40 is constituted of an LED attachment portion 40a to which the LED substrate 418 is attached, a heat-dissipating portion 40b that outwardly extends from the rear edge (facing a chassis 414) of the LED attachment portion 40a and that makes surface-to-surface contact with a bottom plate 414a of the chassis 414, and a reinforcement portion 40c that extends from the front edge (facing a frame 413) of the LED attachment portion 40a toward the inside and outside, respectively, and that closes an opening 430a of a wiring passage 430. Of the respective portions, the LED attachment portion 40a is disposed such that a prescribed gap is formed between the LED attachment portion 40a and a side wall 413b, and this gap is used as a printed board housing space BS in which a printed board 427 is housed. The heat-dissipating portion 40b is held by a screw SM in such a manner that the heat-dissipating portion 40b is interposed between the side wall 413b of the frame 413 and the bottom plate 414a of the chassis 414. The reinforcement portion 40c has a first portion 40c1 continued from the LED attachment portion 40a and disposed outside of the wiring passage 430, and a second portion 40c2 that protrudes from the first portion 40c1 toward the inside of the wiring passage 430. As a whole, the reinforcement portion 40c closes an opening 430a of the wiring passage 430. The first portion 40c1 abuts on the inner surface of a panel pressing portion 413a of the frame 413, and abuts on a light-emitting surface 416a of a light guide plate 416, respectively. In the second portion 40c2, a screw hole 435 is formed to lock the screw SM. In the reinforcement portion 40c, flexible substrate passages 439 through which flexible substrates 426 pass are formed in positions that overlap the respective flexible substrates 426 in a plan view.

<Other Embodiments >

The present invention is not limited to the embodiments shown in the drawings and described above, and the following embodiments are also included in the technical scope of the present invention, for example.

(1) In the respective embodiments above, the wiring passage opened toward the inside over the entire length of the wiring path of the wiring member, but the present invention also includes a configuration in which the wiring passage has an opening only in a portion of the wiring path of the wiring member, and the other portions are closed. In this case, it is preferable that the opening of the wiring passage be disposed near a substrate connector of an LED substrate.

(2) In the respective embodiments above, the reinforcement member extended over the entire length of the wiring passage, but the present invention also includes a configuration in which the length dimension of the reinforcement member is shorter than the length dimension of the wiring passage, and the reinforcement member closes only a portion of the wiring passage. In this case, a plurality of reinforcement members may be attached to one wiring passage.

(3) In addition to the shape shown in the respective embodiments above, the cross-sectional shape of the wiring passage may be appropriately changed, and the present invention also includes a configuration in which the cross-sectional shape of the wiring passage is a circle, oval, or polygon other than a quadrangle such as a triangle or trapezoid. If the shape of the wiring passage is changed, it is preferable that the shape of the reinforcement member be also changed in accordance therewith such that the reinforcement member abuts on an opening edge of the wiring passage.

(4) In the respective embodiments above, the protrusion protruding from the panel pressing portion of the frame constituted a part of the opening edge of the wiring passage, and the opening area of the wiring passage was narrowed by the protrusion, but this protrusion may be omitted. In this case, it is preferable that the height of the second portion of the reinforcement member that is inserted into the wiring passage be substantially the same as the height of the wiring passage such that the second portion abuts on the opening edge.

(5) In addition to the shape shown in the respective embodiments above, the shape of the protrusion protruding from the panel pressing portion of the frame may be appropriately changed. If the shape of the protrusion is changed, it is preferable that the shape of the reinforcement member be also changed in accordance therewith such that the reinforcement member abuts on the protrusion.

(6) In the respective embodiments above, the screw hole that locks the screw was formed in the reinforcement member, but it is possible to configure the reinforcement member without the screw hole. In such a case, a screw hole can be formed in the side wall of the frame, for example, such that the screw is locked by the screw hole. Also, in this case, a screw for attaching the reinforcement member to the frame can be separately prepared, and a screw hole can be formed in the protrusion so as to lock the screw.

(7) In the respective embodiments above, the screw that is locked by the screw hole of the reinforcement member was inserted from the rear side of the chassis along the Z axis direction, but the present invention also includes a configuration in which the screw is inserted from the side of the frame along the X axis direction or the Y axis direction. In this case, it is possible to employ a configuration in which the side wall of the frame and the reinforcement member are aligned along the attachment direction of the screw (X axis direction or Y axis direction), and the screw thru-hole and the screw hole are formed therein, respectively.

(8) In the respective embodiments above, the screw that is locked by the screw hole of the reinforcement member was inserted form the rear side of the chassis along the Z axis direction, but the present invention also includes a configuration in which the screw is inserted from the front side of the chassis along the Z axis direction. In this case, the wiring passage may be formed in the chassis.

(9) In addition to the size shown in the respective embodiments above, the size of the cover member, that is, the area of the chassis that is covered can be appropriately changed, and the present invention also includes a configuration in which the cover member covers more than half of the chassis, or in which the cover member covers less than half of the chassis, for example. The position of the cover member on the chassis may also be appropriately changed.

(10) The present invention also includes a configuration in which the positioning buffer member described in Modification Example 1 of Embodiment 1 is provided in the reinforcement member or heat-dissipating reinforcement member described in Embodiments 2 to 5 above.

(11) It is also possible to apply the configuration of Embodiment 4 (configuration in which the heat-dissipating member is omitted) to the LED unit of Embodiments 1 and 3.

(12) It is also possible to apply the heat-dissipating reinforcement member of Embodiment 5 to the LED unit and the reinforcement member of Embodiments 1 and 3.

(13) In the respective embodiments above, the liquid crystal panel was directly placed on the optical members, but the present invention also includes a configuration in which a panel receiving member that receives the liquid crystal panel from the rear side is provided, and the liquid crystal panel is sandwiched between the panel receiving member and the frame.

(14) In addition to the respective embodiments above, the arrangement of the LED units (LED substrates, heat-dissipating members) can be appropriately changed. The present invention also includes a configuration in which one LED unit is disposed so as to face only one longer side edge or one shorter side edge of the light guide plate, or a configuration in which three LED units are disposed so as to face respective three side edges of the light guide plate.

(15) In the respective embodiments above, two LED units (LED substrates, heat-dissipating members) were disposed at one side of the light guide plate, but one LED unit or three or more LED units may be disposed at one side of the light guide plate.

(16) In the respective embodiments above, the frame and the chassis constituting the exterior member were both made of a metal, but the present invention also includes a configuration in which one or both of the frame and the chassis are made of a synthetic resin. It is preferable to employ this configuration in a mid- to small-sized model that does not require the liquid crystal display device to have very high mechanical strength.

(17) In the respective embodiments above, the power supply board was provided with the function of powering the LEDs, but the present invention also includes a configuration in which an LED driver board that powers the LEDs is separated from the power supply board.

(18) In the respective embodiments above, the main board was provided with a tuner part, but the present invention also includes a configuration in which a tuner board that has a tuner part is separated from the main board.

(19) In the respective embodiments above, the colored portions of the color filters provided in the liquid crystal panel included the three colors of R, G, and B, but it is possible to have the colored portions include four or more colors.

(20) In the respective embodiments above, LEDs were used as the light source, but other types of light source such as an organic EL may also be used.

(21) In the respective embodiments above, TFTs were used as switching elements for the liquid crystal display device, but the present invention can also be applied to a liquid crystal display device using other types of switching elements than TFTs (such as thin-film diodes (TFD), for example), and in addition to a color liquid crystal display device, the present invention can be applied to a liquid crystal display device that conducts black and white display.

(22) In the respective embodiments above, a liquid crystal display device using a liquid crystal panel as a display panel was described as an example, but the present invention can be applied to a display device that uses another type of display panel.

(23) In the respective embodiments above, a television receiver that includes a tuner part was illustratively shown, but the present invention is also applicable to a display device without a tuner part.

(24) In the respective embodiments above, the wiring member had a plurality of coated wires that extend along the wiring path, but the present invention also includes a configuration in which the wiring member has a flexible flat conductive body such as FFC (flexible flat cable) that extends along the wiring path, for example.

DESCRIPTION OF REFERENCE CHARACTERS

10 liquid crystal display device (display device)
11 liquid crystal panel (display panel)
11*c* display surface
12, 112 backlight device (illumination device)

13, 113, 213, 313, 413 frame (holding member, exterior member)
13a, 113a, 413a panel pressing portion
13b, 113b, 213b, 313b, 413b side wall (outer edge portion)
14, 114, 214, 414 chassis (holding member, exterior member)
14a1, 114a1 light guide plate receiving portion
14a3 screw attachment portion (fastening member attachment portion)
16, 116, 216, 316, 416 light guide plate
17, 117, 217, 317, 417 LED (light source)
26, 126, 226, 426 flexible substrate
28, 128, 228 wiring member
29 wiring thru-hole
30, 130, 230, 330, 430 wiring passage
30a, 130a, 230a, 430a opening
34, 234 reinforcement member
34a, 40c1 first portion (light guide plate supporting portion, holding member supporting portion)
34b, 40c2 second portion (fastening member locking portion)
36 relief space
38 positioning buffer member
39 flexible substrate passage
40 heat-dissipating reinforcement member (reinforcement member)
134A first reinforcement member (reinforcement member)
134B second reinforcement member (reinforcement member)
AM exterior member
CV cover member
PWB power supply board (light source driver substrate)
SM screw (fastening member)
TV television receiver

The invention claimed is:

1. A display device, comprising:
a light source;
a display panel that conducts display using light from the light source;
a light guide plate laid on a side of the display panel opposite to a display surface side, the light guide plate being disposed such that an end face thereof faces the light source;
an exterior member constituted of a pair of holding members that sandwich and hold the display panel and the light guide plate from the display surface side and a side opposite thereto, the pair of holding members housing the light source therebetween, the exterior member constituting an exterior of the display device;
a fastening member that is disposed in an outer edge portion of the pair of holding members, thereby fastening the pair of holding members to each other, the outer edge portion surrounding the display panel; and
a wiring member connected to the light source,
wherein a wiring passage through which the wiring member passes is formed in an inner surface of the outer edge portion of one of the pair of the holding members, the wiring passage corresponding in position to the fastening member in a plan view.

2. The display device according to claim 1,
wherein, in the holding member having the wiring passage formed therein, a reinforcement member is attached so as to close an opening of the wiring passage.

3. The display device according to claim 2,
wherein the wiring passage is formed so as to extend along a wiring path of the wiring member and so as to have an opening along an entire extension direction thereof, and the reinforcement member is formed so as to extend along the wiring passage.

4. The display device according to claim 2,
wherein the fastening member is attached so as to penetrate the outer edge portion of the pair of holding members, and
wherein the reinforcement member has a fastening member locking portion that locks the attached fastening member.

5. The display device according to claim 4,
wherein the fastening member locking portion protrudes into the wiring passage in a direction along which the reinforcement member is attached to the holding member having the wiring passage formed therein, the fastening member locking portion also being configured such that a relief space for having the wiring member therein is formed between a protrusion end face of the fastening member locking portion and an inner surface of the wiring passage.

6. The display device according claim 2,
wherein the reinforcement member has a light guide plate supporting portion that is disposed so as to overlap the light guide plate when viewed from the display surface side, the light guide plate supporting portion abutting on a surface of the light guide plate that faces the display panel.

7. The display device according to claim 6,
wherein the reinforcement member has a holding member supporting portion that is disposed so as to correspond in position to the light guide plate supporting portion when viewed from the display surface side, the holding member supporting portion abutting on a surface of the holding member disposed on the display surface side, of the pair of holding members, said surface facing the light guide plate.

8. The display device according to claim 6, further comprising a plurality of flexible substrates arranged at intervals along an edge of the display panel,
wherein, in the reinforcement member including the light guide plate supporting portion, a plurality of flexible substrate passages through which the plurality of said flexible substrates pass are formed at intervals along the edge of the display panel.

9. The display device according claim 2,
wherein the reinforcement member is provided with a positioning buffer member that is disposed outside of the display panel and that abuts on an end face of the display panel.

10. The display device according claim 2,
wherein, of the pair of holding members, the holding member that is disposed on the display surface side has a panel pressing portion that is in parallel with the display surface of the display panel and that presses the display panel, and side walls that protrude from an outer edge portion of the panel pressing portion toward a side opposite to the display surface side, the side walls abutting on the holding member disposed on the side opposite to the display surface side, and
wherein, in at least one of the side walls, the wiring passage is formed in a protrusion base portion thereof, and the fastening member is disposed in a protrusion end portion thereof, and the reinforcement member is disposed so as to abut on the panel pressing portion and said side wall, respectively.

11. The display device according to claim 1,
wherein the wiring passage is formed in the holding member disposed on the display surface side among the pair of the holding members, and
wherein the fastening member is inserted in the outer edge portion of the pair of holding members from a side opposite to the display surface side.

12. The display device according to claim 11,
wherein, of the pair of holding members, the holding member disposed on the side opposite to the display surface side has a light guide plate receiving portion disposed in parallel with a surface of the light guide plate to receive the light guide plate, and a fastening member attachment portion that extends outwardly from an outer edge of the light guide plate receiving portion so as to allow the fastening member to be disposed therein by penetrating said fastening member attachment portion, and
wherein the light guide plate receiving portion and the fastening member attachment portion are flush with each other.

13. The display device according to claim 1,
wherein, of the pair of holding members, the holding member disposed on a side opposite to the display surface side has a wiring thru-hole formed therein, the wiring thru-hole being continued to the wiring passage and being used to guide the wiring member out of said holding member, and
wherein a light source driver substrate and a cover member are attached to the holding member having the wiring thru-hole, the light source driver substrate being connected to the wiring member led out through the wiring thru-hole and being able to drive the light source, the cover member being disposed so as to cover the light source driver substrate and the wiring member led out through the wiring thru-hole.

14. The display device according to claim 13,
wherein a plurality of said light sources are disposed on at least two sides across the light guide plate, and
wherein a plurality of said wiring passages are formed so as to open toward the plurality of light sources disposed on two sides, respectively, and the wiring thru-hole, the light source driver substrate, and the cover member are located closer to one of said at least two sides across the light guide plate where the light sources are disposed.

15. A television receiver, comprising the display device according to claim 1.

* * * * *